(12) United States Patent
Pant et al.

(10) Patent No.: US 9,773,031 B1
(45) Date of Patent: Sep. 26, 2017

(54) DUPLICATION AND DELETION DETECTION USING TRANSFORMATION PROCESSING OF DEPTH VECTORS

(71) Applicants: Krishna Pant, San Jose, CA (US);
Taylor Sittler, San Francisco, CA (US);
Ryan Barrett, San Francisco, CA (US)

(72) Inventors: Krishna Pant, San Jose, CA (US);
Taylor Sittler, San Francisco, CA (US);
Ryan Barrett, San Francisco, CA (US)

(73) Assignee: COLOR GENOMICS, INC., Burlingame, CA (US)

( * ) Notice: Subject to any disclaimer, the term of this patent is extended or adjusted under 35 U.S.C. 154(b) by 0 days.

(21) Appl. No.: 15/489,473

(22) Filed: Apr. 17, 2017

Related U.S. Application Data

(60) Provisional application No. 62/324,080, filed on Apr. 18, 2016.

(51) Int. Cl.
*G06F 17/30* (2006.01)
(52) U.S. Cl.
CPC .. *G06F 17/30303* (2013.01); *G06F 17/30312* (2013.01); *G06F 17/30569* (2013.01)
(58) Field of Classification Search
CPC ......... G06F 17/30303; G06F 17/30312; G06F 17/30569
USPC ........................................................ 707/756
See application file for complete search history.

(56) References Cited

U.S. PATENT DOCUMENTS

| | | | |
|---|---|---|---|
| 6,542,896 B1* | 4/2003 | Gruenwald | ....... G06F 17/30569 |
| 2011/0098193 A1* | 4/2011 | Kingsmore | .......... C12Q 1/6869 |
| | | | 506/9 |
| 2015/0379193 A1* | 12/2015 | Bassett, Jr. | ............. G06F 19/28 |
| | | | 702/19 |

OTHER PUBLICATIONS

U.S. Appl. No. 15/133,089, filed Apr. 19, 2016.
U.S. Appl. No. 62/150,218, filed Apr. 20, 2016.
U.S. Appl. No. 62/274,660, filed Jan. 4, 2016.

* cited by examiner

*Primary Examiner* — Evan Aspinwall
(74) *Attorney, Agent, or Firm* — Kilpatrick Townsend & Stockton LLP

(57) ABSTRACT

Techniques for accurately identifying duplications and deletions using depth vectors. A depth vector is generated for each of multiple clients based on a set of reads that is received and aligned to a reference data set. A transformation processing of the depth vectors is performed to produce multiple components. Each of the components is assigned an order based on the extent to which it accounts for cross-client differences in the depth vectors. Each of the components includes an intensity, multiple values, and multiple client weights. A subset of the components is identified based on the order. A sparse indicator and positional data for the sparse indicator can be determined from the components in the subset, and one or more clients can be identified as being associated with the components.

20 Claims, 12 Drawing Sheets

DUPLICATION AND DELETION DETECTION USING TRANSFORMATION PROCESSING OF DEPTH VECTORS

CROSS-REFERENCES TO RELATED APPLICATIONS

The application claims the benefit of and the priority to U.S. Provisional Application No. 62/324,080, filed on Apr. 18, 2016, which is hereby incorporated by reference in its entirety for all purposes.

BACKGROUND OF THE INVENTION

Various systems and methods are available for processing reads in which one or more differences between a reference data set and a client data set may be identified as sparse indicators. Different types of sparse indicators vary in the degree to which they can be accurately identified. For example, sparse indicators corresponding to duplications and deletions may be particularly difficult to identify due to the differences between the reference data set and the client data set being spread over a wide range of identifiers. In contrast, other types of sparse indicators occur over a narrow range of identifiers or at a single identifier which may be more accurately identified. Conventional approaches to identify duplications and deletions that rely only on a direct comparison between the reference data set and the client data set are inaccurate and produce unsatisfactory results. Accordingly, new systems, methods, and other techniques for accurately identifying duplications and deletions are needed.

BRIEF SUMMARY OF THE INVENTION

Techniques are disclosed for generating and transforming depth vectors for sparse-indicator detection. The method may include, for each client of a set of clients, receiving a set of reads, each read of the set of reads being associated with the client, each read of the set of reads including a set of identifiers, the set of identifiers being arranged in a particular order in the read. The method may also include, for each client of the set of clients, aligning each read of the set of reads with a portion of a reference data set. The method may further include, for each client of the set of clients, generating a depth vector for the client that includes a plurality of elements, each element of the plurality of elements being generated based on a quantity of reads that include an identifier aligned to a portion that includes a particular position within the reference data set. In some embodiments, the method includes performing a transformation processing of the depth vectors to produce a plurality of components, each of the plurality of components being assigned an order based on an extent to which the component accounts for cross-client differences.

The method may also include identifying a subset of the plurality of components based on the order. The method may further include, for each component in the subset, generating, for each client in the set of clients, a weight for the component. In some embodiments, the method includes, for each component in the subset, determining, for each client of one or more of the set of clients, that the weight for the component indicates that the client is to be associated with a sparse indicator. The method may also include, for each component in the subset, determining positional data for the sparse indicator based on values in the component. The method may further include, for each component in the subset, storing, for each of the one or more of the set of clients, an association between an identifier of the client and sparse-indicator data that includes the positional data.

In some embodiments, the method includes, for each client of a set of clients, generating a normalized depth vector for the client based on the depth vector for the client and a plurality of other depth vectors, each of the plurality of other depth vectors being associated with a corresponding other client different than the client. In some embodiments, generating the normalized depth vector includes, for each element of the plurality of elements, identifying, from each depth vector of at least one of the plurality of other depth vectors, an other depth value from the depth vector, the other depth value being associated with the element, generating a normalization factor for the element based at least in part on each identified other depth value, and defining a value for the element in the normalized depth vector based on a value for the element in the depth vector and the normalization factor.

In some embodiments, assigning the order to each of the plurality of components includes assigning an intensity to each of the plurality of components based on the extent to which the component accounts for cross-client differences and assigning the order to each of the plurality of components by sorting the plurality of components by intensity in descending order. In some embodiments, the method includes identifying one or more first components of the plurality of components and identifying one or more second components of the plurality of components. In some embodiments, the intensity assigned to each of the one or more first components is greater than the intensity assigned to each of the one or more second components. In some embodiments, the subset of the plurality of components includes the one or more first components but not the one or more second components.

In some embodiments, determining, for each client of one or more of the set of clients, that the weight for the component indicates that the client is to be associated with the sparse indicator includes determining that the weight for the component is above a predetermined threshold. In some embodiments, determining the positional data for the sparse indicator based on the values in the component includes identifying one or more values of the values in the component that are above a predetermined threshold. In some embodiments, each of the plurality of components includes a vector comprising the values. In some embodiments, a size of the values corresponds to a size of the depth vector and a size of the plurality of components corresponds to a size of the set of clients. In some embodiments, the method includes determining whether the sparse indicator corresponds to a duplication or a deletion.

Some embodiments of the present disclosure include a system including one or more data processors. In some embodiments, the system includes a non-transitory computer readable storage medium containing instructions which when executed on the one or more data processors, cause the one or more data processors to perform part of all of one or more methods and/or part or all of one or more processes disclosed herein. Some embodiments of the present disclosure include a computer-program product tangibly embodied in a non-transitory machine-readable storage medium including instructions configured to cause one or more data processors to perform part of all of one or more methods and/or part or all of one or more processes disclosed herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart or diagram may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Figure 1:
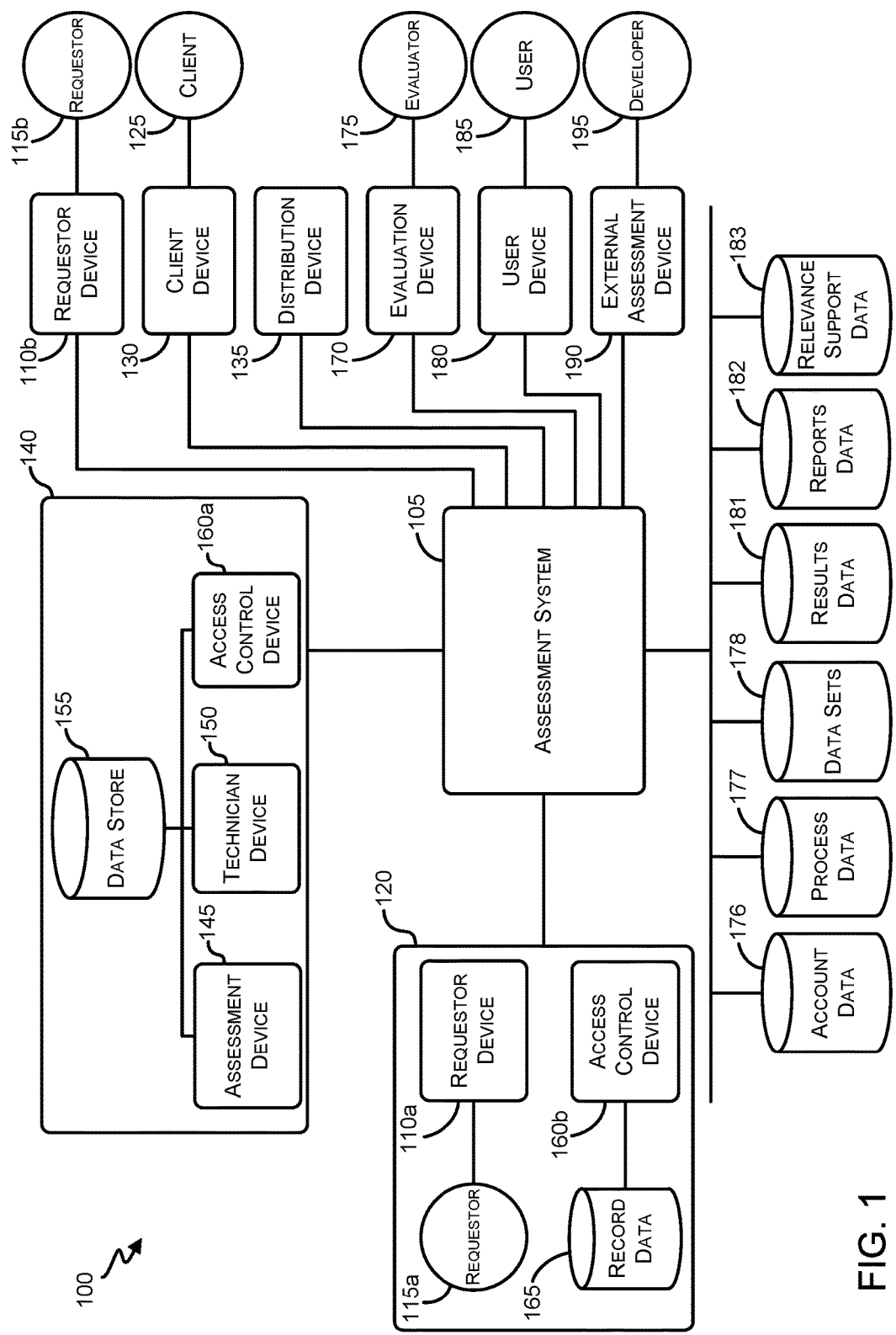
FIG. 1 shows a representation of a data processing network, in accordance with some embodiments of the invention.
Figure 2:
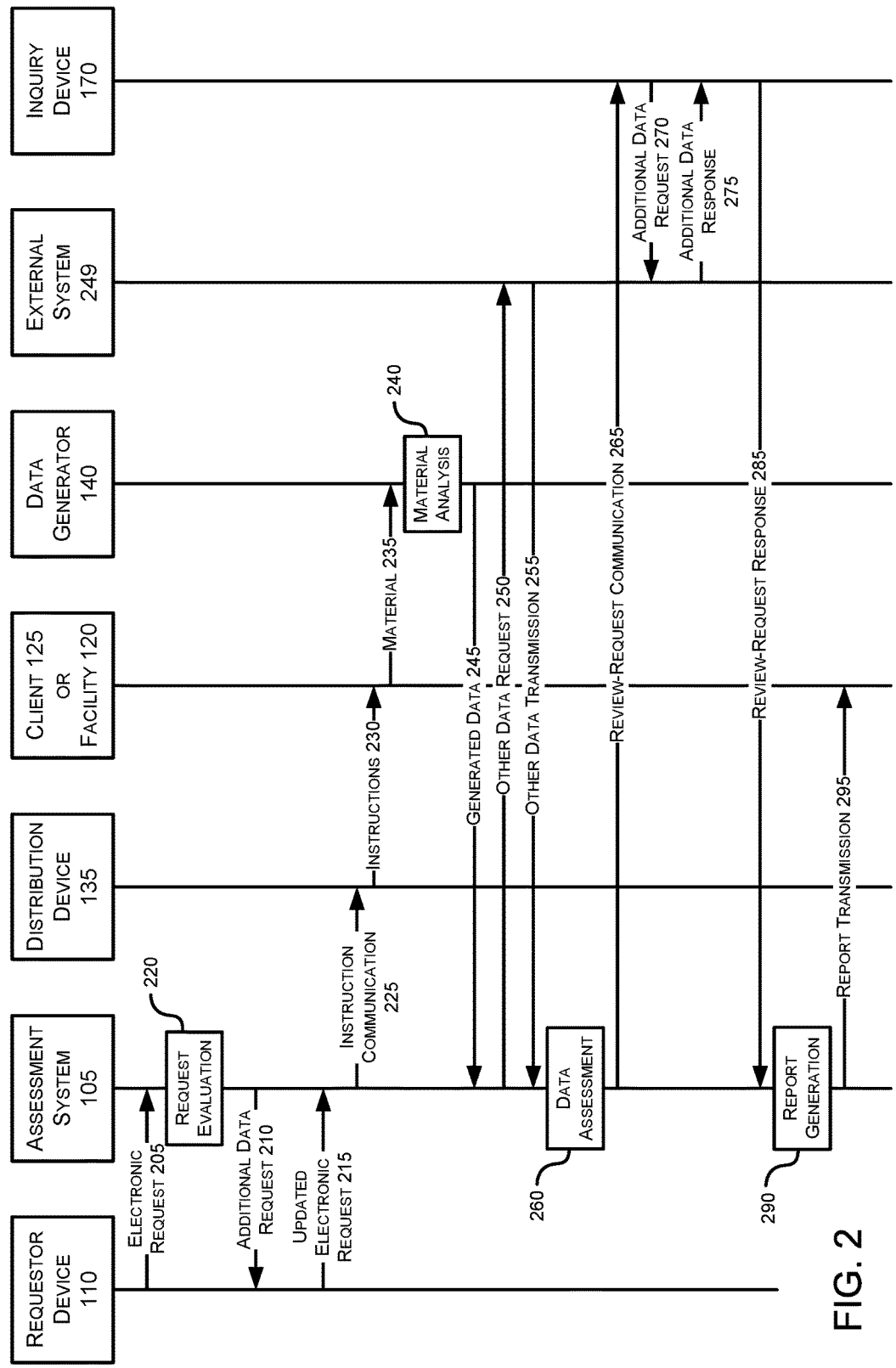
FIG. 2 shows a communication exchange between systems and devices of an data processing network, in accordance with some embodiments.

FIG. 1 shows a representation of an assessment network 100. In addition, FIG. 2 illustrates interactions between various systems or components of assessment network 100 to illustrate the flows of data and materials, for example. An assessment system 105 may, for example, receive an electronic request 205 from a requestor device 110. Assessment system 105 may include one or more electronic devices (e.g., storage devices, servers, and/or computers) and may, but not need, reside partly or entirely at a remote server. Requestor device 110 may be configured and located to receive input from a requestor 115. In one instance, requestor device 110a is located in an external facility 120. In one instance, requestor device 110b includes an internally linked requestor device 110b, such as one that itself receives invitations, such as from assessment system 105, to generate electronic requests.

Request 205 may include instructions to conduct a dataset analysis, for example. Optionally, request 205 may be encrypted prior to transmission; such an electronic request may be decrypted upon receipt. Request 205 may identify, or otherwise indicate, one or more states to be evaluated during the analysis and/or during an assessment. Request 205 may identify a client and/or include additional data pertaining to the client, such as client-identifying data.

The client may be equated to, by assessment system 105, a client device 130. In some instances, a client device 130, associated with client 125, initially transmits a preliminary electronic request for the analysis and/or assessment to assessment system 105. For example, such a preliminary electronic request may be initiated via interaction with a website associated with assessment system 105. The same or a subsequent preliminary request may identify a particular requestor (e.g., by name, office location, phone number, and/or email address) and/or may request that a requestor 115b associated with an internally linked requestor device 110b submit such a request.

When a particular entity is identified in a preliminary electronic request, assessment system 105 may identify a destination address (e.g., IP address or email address) associated with the entity and transmit a communication identifying information associated with the preliminary request (e.g., the client, a type of analysis, and so on). The communication may include a partial instruction and/or an input field that would confirm that the request of the client 125 is to be generated and transmitted back to assessment system 105. Such a communication may facilitate receipt of the electronic request 205 from requestor device 110b.

When it is requested that a requestor 115b associated with an internally linked requestor device 110b submit such a request, assessment system 105 may transmit a similar communication to a requestor device 110b that may have been selected from among multiple internally linked requestor devices. The selection may be based on a load balancing technique, availability hours, expertise, locations of the multiple requestor devices, a pseudo-random selection technique, and/or an entity affiliation.

Once request 205 has been received from a requestor device 110 (e.g., in response to a preliminary request from a client device 130), assessment system 105 may evaluate, such as at block 220, the request 205 to ensure that all required data has been provided and that all required data pertaining to client 125 has been identified (e.g., via the request, a preliminary request and/or stored data). If assessment system 105 determines that all required information has not been identified, a request 210 for such information may be transmitted to requestor device 110 and/or client device 130. The request 205 may be updated with this information and an updated electronic request 215 may be transmitted to assessment system 105. In various instances, an object provided to a user depends on an analysis requested, whether, and what kind of, new data-generation processing of a material is required for the analysis, a number of data-set units being assessed (e.g., and whether they have been previously assessed), a number and/or type of analyses being requested, a number and/or type of analyses previously requested, a number and/or type of analyses predicted to be requested subsequently, a state for which a progression prediction is being requested, whether a user is granting other entities' access to the client's data or results, whether a user is authorizing additional analyses to be performed on the client's data, and/or whether a user is granting permission to send offers to request user access to results or reports other than those initially being requested.

When all required information has been provided, assessment system 105 may send an instruction communication 225 to a distribution device 135. Optionally, communication 225 may be encrypted prior to transmission; such an encrypted communication may be decrypted upon receipt. Optionally, communication 225 may be transmitted using communications system 308 and/or over one or more network links, such as including transmission, at least in part, over a public communications network, such as the Internet. Communication 225 may include, for example, a name and address of client 125 and, in some instances, an indication as to what is to be provided to client 125 for collection of a material for subsequent analysis. For example, a request 205 may indicate a type of analysis that is to be performed on a material (e.g., an analysis pertaining to a likelihood of getting one or more particular types of states) and/or a type of material (e.g., type of sample) that is to be analyzed. Communication 225 may identify the type of analysis, type of material, and/or kit associated with collection of the material. The communication 225 may thus facilitate and/or trigger a physical distribution of instructions 230, which may include a kit or other sample collection materials, to a client address. The instructions 230 may include, for example, instructions as to how to collect a material, a container for storing the material and/or information pertaining to an instruction or type of analysis to be conducted. Alternatively, the instructions 230 may be provided to a facility 120, such as may be associated with a requestor 115a, who may aid client 125 in obtaining the material.

A material 235 from client 125 may then be directed to and received at a data generator 140 for analysis 240. Data generator 140 may be, for example, part of a facility. Data generator 140 may include one or more assessment devices 145 configured to generate data reads, data elements, or data sets for various data-set units using the material 235 as part of analysis 240. For example, an assessment device 145 may include a data-characterizer device (e.g., sequencer and/or polymerase chain reaction machine). Data generator 140 may further include one or more devices 150, such as a desktop or laptop computer. Generated data 245 generated by or at one or more devices (e.g., assessment device 145 or technician device 150) may be stored at a data store 155, which may be remote from all data generator devices or part of a data generator device. Data 245 may, for example, include identifying client information (e.g., a name and address), facility information (e.g., location and name), device specifications (e.g., manufacturer and model of assessment device) and data. In some embodiments, a facility, such as facility 120 or facility 140, may correspond to a lab.

In some instances, data is optionally collected or requested from one or more external systems 249. Thus, assessment system 105 may transmit one or more other data requests 250 and one or more other data transmissions 255 may provide the other data. For example, one or more data sets and/or one or more processed versions thereof (e.g., identifying one or more sparse indicators) corresponding to an existing or new client may be received from an external system 249. As another example, assessment system 105 may transmit a client data set to an external system 249, and external system 249 may then return a result of an assessment of the client data set. As yet another example, other data may include a data set (or results based on such data) corresponding to another individual (e.g., an entity related to a client and/or an entity sharing a characteristic with a client). The other individual may be, for example, identified based on input from the client and/or automatically identified (e.g., based on a query of a data store to identify clients associated with inputs or results indicating a shared characteristic or relationship). In some instances, a state assessment variable may be generated based on data from multiple other people, and the data for each other person may be weighted based on (for example) how closely related the person is with a client and/or how many or which characteristics the person shares with a client.

An access control device 160a may control which devices and/or entities may gain access to data 245, which may apply to devices and/or entities internal to data generator 140 and/or to devices and/or entities external to data generator 140. Access control device 160a may implement one or more rules, such as restricting access to client data to one or more particular devices (e.g., associated with assessment system 105). Such access may further or alternatively be controlled via logins, passwords, device identifier verification, etc.

In various instances, access control device 160a controls access via control of pushed transmissions and/or via control of processing pull requests. For example, a rule may indicate that data 245 pertaining to a material, such as a sample, is to automatically be transmitted to a particular assessment system 105 (and/or device associated therewith) upon completion of a facility-based assessment or detection of particular data (e.g., data matching a request). Access control device 160a may then monitor for such a criterion to be met and may then generate and transmit appropriate data.

Data 245 may include a plurality of data reads, data elements, or sets (e.g., each data read in the plurality of data reads corresponding to a same client, or at least some of the plurality of data reads corresponding to different clients). In various instances, data 245 may be transmitted to assessment system 105 in a batch-mode, in a streaming mode, in real-time as data is produced, and/or upon request. Data 245 may also be stored at a data store local or remote to data generator 140. A given transmission or stream may include data that corresponds to a single, or in other instances to multiple, client, sample, and/or data reads. In some instances, access control device 160a evaluates one or more transmission conditions, which may indicate, for example, whether and/or what data is to be transmitted given a quantity of data collected (e.g., generally, since a past transmission and/or for a given client or sample) and/or given a time since a previous transmission. In one instance, as data reads are generated by an assessment device, a data set is generated so as to include each new data read and one or more identifiers (e.g., of a client, sample, time and/or facility device). The data may then be transmitted via a discrete communication (e.g., via FTP, over a webpage upload, email message, or SMS message) to assessment system 105. In one instance, the data may then be appended to a stream that is being fed to assessment system 105.

It will be appreciated that assessment network 100 may, in some instances, include multiple data generators 140, each of which may include an assessment device 145, technician device and/or access control device 160a. Further, a given data generator 140 may, in some instances, include multiple assessment devices 145, multiple technician devices 150 and/or multiple access control devices 160a. Thus, data 245 received at assessment system 105 may include data collected by and/or derived from data collected by different assessment devices, which may result in the data having different biases, units, and/or representation. Similarly, personnel operating different technician devices 150 may utilize different protocols and/or data interpretation techniques, which may again result in receipt of data at assessment system 105 that has different biases, units, variables, and so on. Further, even data originating from a same device may, in time, exhibit different biases, units, and so on, which may be a result of a manipulation of a control of the device and/or equipment wear.

Thus, in some instances, assessment system 105 performs a comparison across data 245 received from a data generator device (e.g., an access control device 160a or directly from an assessment device 145 or technician device 150) associated with data generator 140. The comparison may be across, for example, data collected at different facilities, data based on measurements collected at different devices, and/or data collected at different times. It will be appreciated that the comparison may include a direct comparison of collected data or comparing preprocessed versions of the collected data. For example, received data may first be preprocessed via a transformation and/or dimensionality-reduction technique, such as principal component analysis, independent component analysis, or canonical correspondence analysis.

The comparison may include, for example, performing a clustering technique so as to detect whether data corresponding to a given facility, device, or time period predominately resides in a different cluster than data corresponding to one or more other facilities, devices, or time periods. The clustering technique may include, for example, a connectivity based clustering technique, a centroid-based clustering technique (e.g., such as one using k-means clustering), a distribution-based clustering technique, or a density-based clustering technique.

The comparison may additionally or alternatively include a statistical technique, such as one that employs a statistical test to determine whether two or more data sets (e.g., corresponding to different facilities, devices, or time periods) are statistically different. For example, a Chi-square, t-test or ANOVA may be used.

The comparison may additionally or alternatively include a time-series analysis. For example, a regression technique may be used to determine whether output from a given device is gradually changing in time.

When it is determined that particular data corresponding to a given facility, device, or time period is different than data corresponding to one or more other facilities, devices, or time periods (e.g., is assigned to a different cluster than other data or is associated with a p-value below a threshold), a normalization and/or conversion factor may further be identified. For example, a normalization and/or conversion factor may be identified based on centroids of data clusters and/or inter-cluster distances. As another example, a linear or non-linear function may be derived to relate data from a given facility, device, or time period to other data.

In some instances, a determination that particular data corresponding to a given facility, device, or time period is different than data corresponding to one or more other facilities, devices, or time periods may indicate that data from the given facility, device, or time period is not to be used. In such instances, an instruction communication may be sent to a facility to reprocess a material, such as a sample.

In addition to receiving data 245, assessment system 105 may further collect one or more other data that may be used to assess, for example, a likelihood for transitioning into a particular state. For example, one type of other data may include inputs provided at a client device 130, such as inputs that indicate past-state data and/or current-state data, familial-state data and statuses, age, occupation, activity patterns, association with environments having particular characteristics, and so on. The other data may be received by way of one or more other data transmissions 255 from external system 249. Optionally, other data transmission 255 may be encrypted prior to transmission; such an encrypted transmission may be decrypted upon receipt. Optionally, other data transmission 255 may be transmitted over one or more network links, such as including transmission, at least in part, over a public communications network, such as the Internet. Optionally, other data transmission 255 may be transmitted over at least a portion of communications system 308.

Another type of other data may include data automatically detected at a client device 130. For example, a wearable client device may track activity patterns so as to estimate calories burned per day, or the wearable client device may estimate a pulse distribution, client temperature, sleep patterns and/or indoor/outdoor time. This data obtained directly by client device 130 may be directly transmitted (e.g., after request 250 and/or authorization handshake) to assessment system 105 and/or via another client device (e.g., via accessing health-data on a phone or computer device). Optionally, other data obtained directly by client device 130 may be transmitted over one or more network links, such as including transmission, at least in part, over a public communications network, such as the Internet. Optionally, other data obtained directly by client device 130 may be transmitted over at least a portion of a communication system. Optionally, other data obtained directly by client device 130 may be part of other data transmission 255.

Yet another type of other data may include record data, which may be stored, for example, at a record data store 165 at and/or associated with an external facility, such as one having provided an electronic request to perform an analysis or assessment pertaining to a client and/or one as identified via input at a client device 130. To illustrate, the other data may identify one or more client reported experiences and/or evaluation results for a client or may include a result of one or more tests.

In some instances, other data may include data pertaining to a different client. For example, it may be determined or estimated that a given client is related to another client. Such determination or estimation may be based on inputs detected at a client device identifying one or more family members (e.g., by name), and a data store may be queried to determine whether any clients match any of the family member identifications. Such relationship determination or estimation may alternatively or additionally be based on a data set analysis, such that a raw or processed data set from the given client is compared to a raw or processed data set from some or all other clients to identify, for example, whether any other clients share a threshold portion of a data set with the client. Upon detecting an above-threshold match, a percentage of value matching may be used to estimate a type of relationship between the clients. Upon identifying a related client, other data corresponding to the related client may be identified. For example, the other data may include a past or current state of the related client. The other data may be identified (for example) based on an input provided by the client or the related client or record data associated with the related client.

Thus, assessment system 105 may have access to, for a given client, one or more data sets, data set availability modification data, client-reported data, record data, test data, activity data, and/or other types of data. These data may be detected, assessed, or otherwise evaluated, at block 260, such as in one or more assessment processes. Data sets may be evaluated to detect and assess sparse indicators, for example, as described below in further detail. The detection and/or assessment at block 260 may be performed, for example, partly or fully at assessment system 105. In some instances, the detection and/or assessment at block 260 is performed in a partly or fully automated manner. In some instances, the detection and/or assessment at block 260 involves processing of inputs provided by a reviewer or evaluator.

Generation of a report, at block 290, may be performed using the results of data assessment of block 260. A report transmission 295 may include the report and be transmitted to client 125 or facility 120, such as by way of client device 130 or requestor device 110a.

Figure 3:
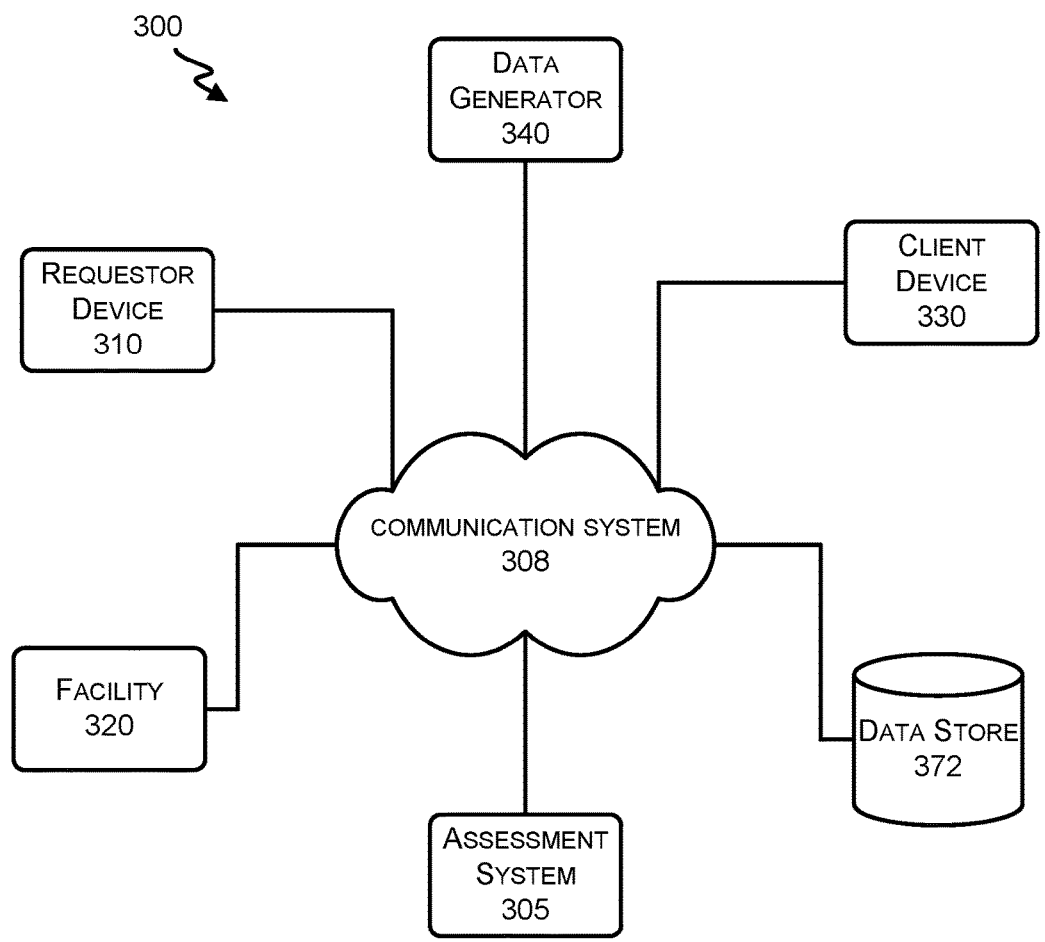
FIG. 3 shows a representation of an example communication network, in accordance with some embodiments.

Referring next to FIG. 3, an assessment network 300 is shown in one embodiment. Assessment network 300 may, but need not, correspond to assessment network 100 shown in FIG. 1. Through the interaction of multiple devices and entities, an assessment system 305 may receive data sets corresponding to individual clients. As illustrated, assessment system 305 may connect, via communication system 308, to each of one or more other systems or devices. Assessment network 300 may also include additional systems or devices, as illustrated in FIG. 3. For example, assessment network 300 may include requestor device 310, facility 320, client device 330, data generator 340, and data store 372, in addition to other systems or devices not explicitly depicted in FIG. 3.

Data may be exchanged between various systems or devices of assessment network, such as by way of communication system 308. Communication system 308 may, for example, include one or more data communication systems or networks, such as a wired or wireless data connection that makes use of or is compliant with one or more Institute of Electrical and Electronics Engineers (IEEE) networking standards, such as 802.3 (Ethernet), 802.11 (Wi-Fi), or 802.16 (WiMAX), or other data communications standards such as IEEE 1394 (FireWire), Bluetooth, Universal Serial Bus (USB), Serial ATA (SATA), Parallel ATA (PATA), Thunderbolt, Fibre Channel, Small Computer System Interface (SCSI), GSM, LTE, etc. Communication system 308 may include one or more TCP/IP compliant interconnections, such as may be present on a private or public communications network, such as the Internet. Communication system 308 may further include servers, systems, and storage devices in the cloud. Communication system 308 may represent or include one or more intermediate systems or data connections between various other components of assessment network 300. Additionally, communication system 308 may represent a direct connection between various other components of assessment network 300, such as a direct connection between assessment system 305 and data store 372, which may optionally allow for communication with data store 372 by other components of assessment network 300 only by way of assessment system 305, for example. It will be appreciated that data store 372 may include one or more data stores, which may optionally be linked or otherwise configured or organized to allow for efficient retrieval and storage of data by reference to different entries in particular data stores or data tables. For example, data store 372 may comprise a relational database or data store, in some embodiments.

One or more of the devices or systems of assessment network 300 may be present at a single location or each may be present at various different locations and be in data communication with one another via communication system 308, depending on the specific configuration. For example, facility 320 and data generator 340 may be at a same location. Requestor device 310 may further be present at facility 320, such as if possessed by a requestor personnel, for example. Similarly, client device 330 may also be present at data generator 340 or facility 320, such as if possessed by a client, for example. In some embodiments, one or more devices or systems of assessment network 300 may be mobile devices, such as a smartphone, tablet computer, laptop, or other compact device, which may facilitate transport between locations or with a user or client. Use of mobile devices may, for example, be advantageous for allowing input to be entered in real-time and/or on request from any location in order to facilitate expedient processing and/or analysis of data or generation of state assessments.

In one instance, assessment system 305 receives a request communication (e.g., via communication system 308) from a requestor device 310 that identifies a client. Client identifying authentication and/or other information can be received from a client device (e.g., which, in some instances, is also requestor device 310). Assessment system 305 may then prime data generator 340 to detect a material associated with the client and generate a set of reads based thereupon.

Upon extracting each read, an alignment process may be performed in which each individual read is aligned with a corresponding portion of a reference data set (e.g., reference genome). The reference data set may include an identifier data set (e.g., a sequence) that identifies a base at each of a set of positions, such as each position along one or more data-set units (e.g., genes). In some instances, the alignment process is performed by correlating each individual read with the reference data set and identifying a maximum or above-threshold value of a resulting correlation function. The maximum value or above-threshold value of the correlation function may correspond to a "best fit" or "good fit" location for aligning a particular read with the reference data set. In some instances, a score can be generated for each of one or more portions of the reference data set by comparing identifiers of a read to corresponding identifiers of the portion, and an alignment can be identified based on the score. (For a score may depend on whether each identifier matches a correspond reference-data identifier, is complementary to a corresponding reference-data identifier or neither.) The alignment process may alternatively or additionally include determining the location along the reference data set in which each individual read shares the most elements and/or read values in common with the reference data set.

Assessment system 305 may detect one or more differences using a client data set, the reference data set, and/or a depth vector that identifies, for each position of the client data set, a number of aligned reads that overlap with each position. For example, a difference may be identified by detecting a difference, at a given position, between a value (e.g., identifier) of the client data set and a corresponding value of the reference data set. As another example, a difference may be identified by detecting an abrupt change in the depth vector. A sparse indicator may be defined for each difference to characterize the difference. For example, a sparse indicator may identify a type of difference observed (e.g., what identifier was present in a client data set as opposed to a reference data set or how the depth vector changed) and a position (e.g., with respect to the reference data set and/or along one or more data-set units) at which the difference was observed.

Each sparse indicator may be assigned to a bucket which may reflect a predicted impact of the detected difference. In some instances, a set of buckets are defined. Each of one, more or all of the buckets may correspond to a predicted likelihood that a client will progress to a given state. A state may include, for example, utilizing a full memory bank, a condition (e.g., medical condition or disease, such as cancer), reduced bandwidth, and/or a connection drop. Thus, buckets may reflect whether and/or a degree to which a difference causes the state (e.g., reflecting memory requirements, whether the difference is (e.g., and/or is likely to be) pathogenic or benign), consumes bandwidth, and/or impairs a connection's stability). For each client, a determination as to how many sparse indicators were assigned to one or more particular buckets may be used to generate a result that identifies a state-progression prediction. The result may be transmitted to requestor device 310 and/or client device 330.

Reads, data sets, sparse indicators, bucket assignments and/or results may be stored (e.g., in association with corresponding client identifiers) in one or more data stores. In some instances, data may be subsequently retrieved for performing an updated assessment (e.g., using a new bucketing protocol or result-generation technique), performing a different type of assessment and/or transmitting data to another device.

In some instances, assessment system 305 detects sparse indicators (e.g., variants) corresponding to duplications and delections by generating and transforming multiple depth vectors corresponding to multiple clients. For example, assessment system 305 may perform a transformation processing of multiple depth vectors to produce a plurality of components. The transformation processing may correspond to a principal component analysis in which a set of uncorrelated orthogonal vectors (i.e., components) are generated. The plurality of components are ordered based on the extent to which they account for cross-client differences that occur in the depth vectors, and a subset of the components is selected based on the order. The subset of the components is selected such that each component in the subset is expected to correspond to a sparse indicator that includes either a duplication or a deletion. The type of sparse indicator and positional data for the sparse indicator may be determined based on values within the component, or based on values within the depth vectors (low values indicating deletions and high values indicating duplications). Furthermore, a set of clients that are associated with the sparse indicator may be determined based on which client weights contribute to the component.

Figure 4:
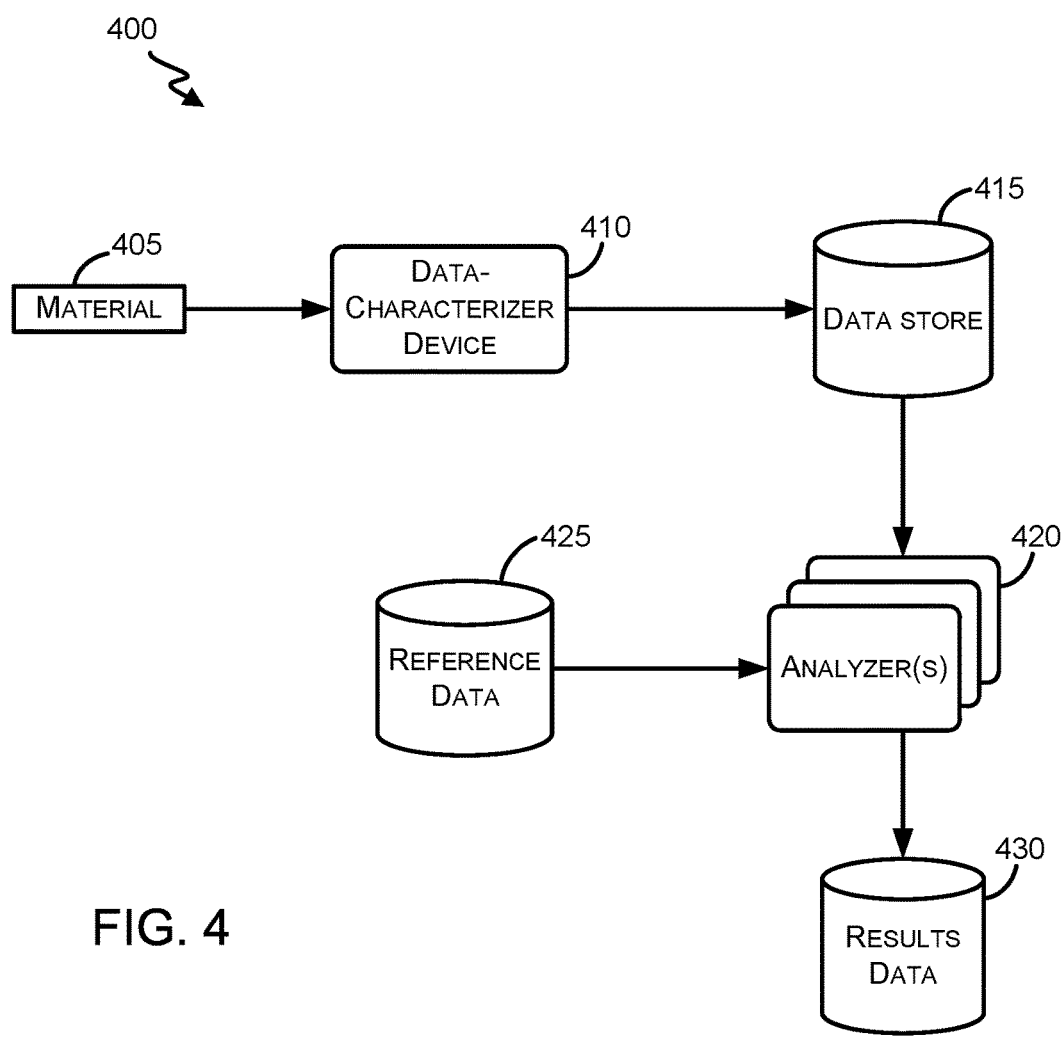
FIG. 4 shows a data flow, in accordance with some embodiments.

Turning next to FIG. 4, a data flow embodiment 400 is shown. Initially, a test material 405 is obtained from a client. As described above, the material 405 may be obtained directly by the client using a collection kit. A client may be able to obtain the material themselves, particularly if the material is easy to collect. Alternatively or additionally, material 405 is obtained at a facility. Obtaining material 405 at a facility may be useful if the material is more difficult to obtain, or if chain-of-custody is a concern.

Material 405 is assessed by a data-characterizer device 410, which may generate a plurality of data sets, including coverage data sets and identifier data sets. As the data sets are determined, they may be stored in data store 415 for subsequent analysis.

Data-characterizer device 410 and data store 415 may be located at a same location, such as a facility. Alternatively, data-characterizer device 410 and data store 415 may be remote from one another. In such a configuration, transmission of data sets from data-characterizer device 410 to data store 415 may occur using any of a variety of data communication standards and/or protocols. In one example, data sets are transmitted from data-characterizer device 410 over a wired and/or wireless network to reach data store 415. In another example, data sets are stored by data-characterizer device 410 directly to a storage medium, such as a flash drive or hard drive, which may be used to facilitate relaying data sets to remote data store 415. Optionally, data store 415 may comprise the storage medium. Data sets stored in data store 415 may be analyzed by data set analyzer 420. Data set analyzer 420 may be located at a same or different location from data-characterizer device 410 and/or data store 415.

Depending on the particular configuration, data sets generated by data-characterizer device 410 and/or stored in data store 415 may be analyzed individually, in real-time as the data sets are produced, or in batches, such as upon completion of a plurality of data sets. Data set analyzer 420 may utilize reference data stored in reference data store 425 in analysis of the data sets generated by data-characterizer device 410 and/or stored in data store 415.

A variety of analyses may be performed on the data sets by data set analyzers 420. For example, data set analyzer 420 may align each read in a data set to a portion of one or more reference sets. Data set analyzer 420 may also generate coverage data and/or identifier data using reads from the data set. Upon completion of the analysis, the information corresponding to the data sets (e.g., coverage data and/or identifier data) and/or alignment indications may be transmitted to and/or stored in one or more results data stores 430, which may correspond to a portion of data store 372.

It will be appreciated that data set analysis may be resource intensive, and thus a plurality of data set analyzers 420 may be used during the analysis process to distribute the resource burden, for example, and/or increase the rate at which data sets may be analyzed. For example, if a plurality of alignments are to be evaluated, such as by determining a potential alignment of an individual data set against multiple reference data sets, it may be desirable to distribute the tasks among multiple data set analyzers 420. Load balancing between a plurality of data set analyzers 420 may be performed to further enhance the use of resources, for example. Additionally, it may be desirable to compare the data sets stored in data store 415 against multiple reference data sets, such as from related family members or from people sharing one or more characteristics, as described above, and comparisons of the data sets with different reference data sets may be performed by different data set analyzers.

Additionally or alternatively, data sets may be analyzed by one or more data set analyzers 420 to identify one or more sparse indicators. Additionally or alternatively, data sets may be analyzed by one or more data set analyzers 420 to categorize each data set, alignment, or detected sparse indicator. Additionally or alternatively, data sets may be analyzed by one or more data set analyzers 420 to score each data set, alignment, or detected sparse indicator. Again, sparse indicators, categories, and scores may be transmitted to and/or stored in results data store 430, which may be included in data store 372.

Detecting sparse indicators may include aligning each data set with a reference data set. The reference data set may include part of a full reference data set and/or may include a data set identified based on identifying median or mode data elements across a plurality of data set derived from samples from a population. In some instances, an alignment is determined to be accurate throughout the client data set, and differences between the client data set and reference data set can be represented as sparse indicators, each corresponding to one or more positions (e.g., relative to an axis of the reference data set or to an axis of the data set). In some instances, a sparse indicator may further be defined using a value or identifier data of the data set (e.g., that differs from a corresponding value in the reference data set). In some instances, a sparse indicator may be defined based on identifying a type of structural difference detected in the data set relative to the reference data set (e.g., duplication, insertion, inversion or deletion). In some instances, an alignment is determined to be accurate throughout part of the data set but not for another part. It may then be determined that such partial alignment is attributable to the client data set, for example, lacking representation of a part of the reference sequence or having an additional set of values. A sparse indicator may therefore identify information corresponding to multiple positions (e.g., reflecting a start and stop of a part of a reference data set not represented in a data set or the converse) and/or multiple values (e.g., reflecting which values were in one of either the reference data set or the data set but not in the other).

In some instances, a state transition likelihood associated with a particular deviation (e.g., sparse indicator) and/or with a combination of deviations is unknown or is associated with a below-threshold confidence. With reference again to FIG. 1 and FIG. 2, upon detecting such a deviation or combination (or a threshold quantity thereof), the particular deviation and/or combination may be identified in a review-request communication 265 and transmitted to an evaluation device 170. Evaluation device 170 may then present the identification to an evaluator 175 and detect input that is indicative of an estimated likelihood to associate with the deviation and/or combination, for example, as part of an optional review analysis process. A review-request response 285 may be transmitted from evaluation device 170 to assessment system 105, for example, to provide the results of any review or input generated by an evaluator 175. The data included in review-request response 285 may be used in report generation process of block 290 and may be included and/or otherwise influence the content of the final report transmitted in report transmission 295.

A result generated by assessment system 105 may include a quantitative or qualitative (e.g., categorical) likelihood variable, such as one corresponding to a transitioning to a particular state. For example, the likelihood variable may include a percentage probability or range of transitioning into a particular state. As another example, the likelihood variable may be partitioned into three categories.

Assessment system 105 may generate an electronic report, at block 290, that includes the result and/or that is selected based on the result. A report communication or transmission 295 may include the report and be transmitted to client 125 or facility 120, such as by way of client device 130 or requestor device 110a. As an example, a report may identify one or more sparse indicators detected in a client data set and/or a bucket of each of one or more sparse indicators. A report may identify a likelihood (e.g., numeric or categorical) of transitioning to a particular state and/or a technique for having generated such a result. A report may identify types of data (e.g., particular data-set units and/or other type of data) used in the analysis. A report may identify a confidence in a result (e.g., a likelihood variable). A report may identify a recommendation (e.g., to contact a requestor or to receive a particular test or evaluation).

In some instances, a report must be approved (e.g., by a requestor 115a or 115b) before it is transmitted to a client device 130. A report-reviewing interface may, but need not, include a configuration to allow a reviewing entity to change or add to the report. A report-reviewing interface may further allow or require a reviewing entity to identify a time at which to send the report to a client.

Assessment system 105 may update and may have access to a variety of data stores, part or all of which may be remote from, co-localized with assessment system 105, and/or included in assessment system 105. One or more of the data stores may include a relational data store, such that data from one data store or structure within a data store may be used to retrieve corresponding data from another data store or structure.

Each of one, more, or all of the data stores may be associated with one or more access constraints. Access constraints applicable to a given data store may be stored as part of the data store or separately (e.g., in an access control data store). Access constraints that apply to one type of data may differ from access constraints that apply to another type of data. For example, account and client data may be associated with stricter access constraints than results data, to make it more difficult for a user, developer, or hacker to be able to link data to a particular individual. An access constraint may identify one or more individuals, devices, systems, and/or occupations permitted to access some or all data in a data store. An access constraint may include a rule, such as one that indicates that a user is permitted to access data pertaining to any of a group of users that the entity was involved in with respect to a transfer of a kit, or that indicates that any low-level authorized user is permitted to access de-identified data but not identifiable data, or that indicates that a high-level authorized user is permitted to access all data. As another example, access constraints may indicate that process data is to be hidden from external developers and available to internal users; that data-set unit, sparse indicator, and data set availability data is to be made available to all authorized external developers and internal users; and that client data is to be availed to authorized internal users and only availed to external developers to the extent to which each corresponding users represented in the data is a user of the developer (e.g., and that the client authorized such data access).

When different access rights apply to different types of data, a query protocol may be established to address instances where a query relates to each type of data. For example, a query may request Variable X for each client corresponding to Data Y, and Variable X and Data Y may correspond to different access constraints. As another example, a query may request a count of clients for which both Data Y and Data Z was detected, and Data Y and Z may correspond to different access constraints. One example of a query protocol is to use a most restrictive overlap of data constraints applying to the query. Another example of a query protocol is to permit use of an at least partly more relaxed access constraint so long as it relates to defining a client set or state and not to results to be returned or processed.

In some instances, an access constraint is configured to inhibit an identification of particular data (e.g., client identity). Such a constraint may relate to a precision of requested data. To illustrate, a constraint may be configured to permit a user to request and receive data identifying client locations, so long as the request is configured to not request too specific of a location and/or so long as the request corresponds to a number of client data elements sufficiently large to obscure (e.g., in a statistical result) a precise location. Compound queries may be more sensitive to potential identification concerns, such that one or more access constraints are configured to permit access to less precise data when multiple data elements are being requested.

Various data stores may be included in assessment networks 100 and 300. The data stores may include, for example, an account data store 176, which may include login credentials for one or more users or clients and/or types of data access to be granted to each user or client; process data store 177, which may identify facility analysis characteristics pertaining to particular data elements (e.g., identifying a facility, piece of equipment, and/or processing time); data sets data store 178, which may identify one or more data sets associated with a given client or material, such as a sample; and one or more data-set expressions or signatures associated with a given client or material, such as a sample. The data stores may further or alternatively include a results data store 181, which may identify one or more sparse indicators identified by and/or one or more results generated by assessment system 105 that are associated with a given client or material, such as a sample.

The data stores may further or alternatively include a reports data store 182, which may include one or more report templates (e.g., each associated with one or more result types) and/or one or more reports to be transmitted or having been transmitted to a client device; and/or a relevance support data store 183, which may identify which types of data (e.g., data-set units, full or partial reference data sets, activity patterns, inputs, records, tests, etc.) are established to be, potentially, established not to be, or unknown whether to be relevant for evaluating a particular type of likelihood (e.g., a likelihood of transitioning into a particular state).

Relevance support data store 183 may include identifications of one or more content objects. The identifications may include, for example, web addresses, journal citations, or article identifiers. In some instances, an identification identifies one or more sources associated with the content object (e.g., scientist, author, journal, or data store). Content objects may be tagged with one or more tags, which may identify, for example, a sparse indicator, a data-set unit, a data set, and/or a type of assessment. In some instances, each of one or more content objects are associated with a score which may reflect a credibility of the content object. The score may be based, for example, on a publication frequency of a source, an impact factor of a source, a date of publication of the content object, and/or a number of citations to the content object.

It will be appreciated that the illustrated data stores 155, 165, 176, 177, 178, 181, 182, and 183 may each, independently and optionally, be included as a portion of data store 372, which may include a relational database, for example.

Assessment network 100 may also include a user device 180 configured to detect input from a user 185. User 185 may be associated with an account or other authentication data indicating that access to some or all of the data is to be granted. Accordingly, user 185 may be able to interact with various interfaces (presented at user device 180) to view data pertaining to one or more particular clients (e.g., in an identified or de-identified manner), to view summary data that relates to data from multiple clients, to explore relationships between data types, and so on. In some instances, an interface may be configured to accept inputs from a user 185 so as to enable the user to request data pertaining to (for example) materials with sparse indicators in particular data-set units, particular sparse indicators and/or state likelihoods.

In some instances, data is transmitted by assessment system 105 and received at user device 180. The transmitted data may relate to durations of work flow processing time periods. Specifically, as may be appreciated by disclosures included herein, generating outputs for users and/or requestors may involve multiple steps, each of which may include a process, which may be referred to herein as a task, of an entity and/or device. Completion times of individual processes may then be monitored and assessed. A work flow may include a structure and definition for these processes. For example, various work flows may include some or all of the following tasks:

Inputs are collected at client device 130, transmitted by client device 130, and received by assessment system 105, where the inputs correspond to a preliminary request to conduct an assessment based on a material and ensure that all required inputs have been received;

A same or different client device 130 (e.g., a wearable device) collects and transmits other data indicative of the client's activity or status;

Inputs collected at requestor device 110a, 110b and transmitted to assessment system 105 that correspond to a request for assessment for the client;

Access control device 160b at facility 120 collects and transmits record data of the client;

Distribution device 135 receives alert corresponding to new request and address information and confirms shipping of kit for sample collection to the client;

Client 125 receives kit, collects material and sends to data generator 140;

Assessment device(s) 145 collects data-set data, and access control device 160a sends facility data to assessment system 105;

Assessment system 105 detects any sparse indicators in data set(s) and/or any modifications in data set expression;

Assessment system 105 assigns any sparse indicators and/or data set availability modifications;

Evaluation device 170 collects inputs identifying an assignment of any sparse indicators and/or data set availability modifications as of an unknown likelihood;

Confirmatory facility testing of any sample associated with a sparse indicator and/or data set availability modification having a particular assignment at same or different facilities;

Assessment system 105 aggregates sparse indicator data, assignment data, record data, user or client inputs, other data, and/or activity or status data and generates one or more likelihood variables;

Assessment system 105 generates electronic report with the one or more likelihood variables;

Evaluation device 170 and/or requestor device 110*a* collect inputs indicating that the electronic report is approved for transmission to client device 130; and Assessment system 105 transmits the electronic report to client device 130.

A work flow may include a task order that indicates that, for example, a first task is to be completed prior to performance of a second task, though a work flow may alternatively be configured such that at least some tasks may be performed in parallel. In some instances, one or more tasks in a work flow are conditional tasks that need not be performed during each iteration of the work flow. Rather, whether a conditional task is to be performed may depend on a circumstance, such as whether a result from a prior task is of a particular type or exceeds a threshold.

Using a work flow, assessment system 105 may track timing of individual tasks during individual iterations of a work flow. Each iteration may correspond to generating a likelihood variable for a given client and may involve various other entities (e.g., reviewers, facilities, etc.), which may be selected based on, for example, user preference, a physical location of a client device, and/or availability. For tasks performed at assessment system 105, timing may be directly determined. For tasks performed by, at, and/or via another device, assessment system 105 may track timing via electronic transmissions between systems. For example, a start may be identified by an instruction communication sent from assessment system 105 and/or a when a communication was received indicating that the corresponding task was beginning. As another example, an end time may be identified by transmission of a communication including a result of the corresponding task sent from assessment system 105 and/or when a communication was received indicating that the corresponding task was complete.

Figure 5:
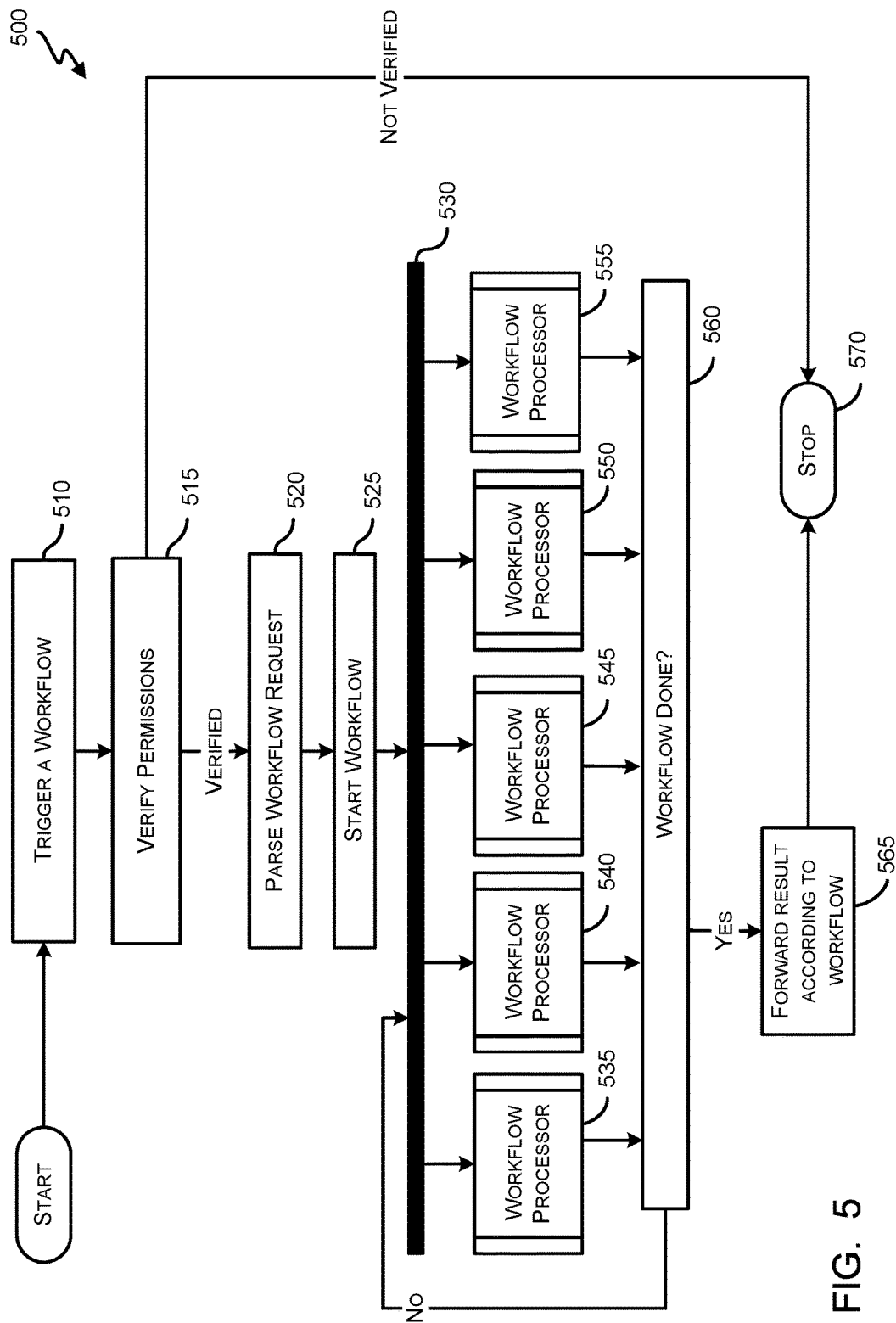
FIG. 5 shows an illustration of a work flow iteration, in accordance with some embodiments.

FIG. 5 shows a representation of an embodiment of a process 500 for processing tasks in the assessment network 100. The process starts when an event triggers a first work flow as shown at block 510. Any number of events occurring internal to the assessment network 100 and external to the assessment network 100 may trigger a first work flow in any number of ways. Each of the assessment system 105, a requestor device 110, a client device 130, a distribution device 135, a facility data generator, an evaluation device 170, a user device 180, and an external assessment device 190 may trigger a work flow, for example. For instance, the assessment system 105 may trigger a work flow when it receives an electronic request 205. A requestor device 110 may trigger a work flow by transmitting electronic request 205. A user device may trigger a work flow based on inputs collected. A data generator 140 may trigger a work flow upon receipt of a sample. Other examples are possible and it will be appreciated from the present description that any one or more data transmissions between various devices and systems of assessment network 100 may trigger a work flow. It will also be appreciated that various work flows may initiated sequentially or simultaneously, depending on the particular need for completion of one work flow to complete before another work flow may begin. In addition, additional work flows may be triggered while in the midst of processing one work flow. In some embodiments, an assessment system or assessment device manages and/or coordinates triggered work flows. Optionally, task start times may be tracked, as described above, and triggering a work flow may include tracking the start time of tasks associated with the work flow.

Some task work flows may require verification of permissions and/or authorizations, such as depicted at block 515, before the work flow is permitted to begin. For example, a transmission of record data of a client may require explicit authorization from a client or a requestor before the transmission may begin, for example, due to the sensitivity of information that may be included in the record data. As another example, transmission of information of a client to an external assessment device may also require client permission. In this way, permission verification may prevent unanticipated or unauthorized transmission of information to a particular work flow processor for which such transmission may be undesirable. Timing of permission request and verification may further be tracked, such as to allow identification of bottlenecks in work flow and/or task processing associated with permission verification. U.S. patent application Ser. No. 15/133,089, filed on Apr. 19, 2016 and U.S. Provisional Applications 62/150,218, filed on Apr. 20, 2016, and 62/274,660, filed on Jan. 4, 2016, disclose details regarding various work flow processes, and are each hereby incorporated by reference in its entirety for all purposes.

As illustrated in FIG. 5, if permissions are not verified, the work flow may be stopped, at block 570. If permissions are verified, the work flow may proceed to block 520. It will be appreciated that not all work flows require permission verification, and so block 515 may be considered to be optional.

Depending on the particular work flow initiated, the work flow request may require parsing, at block 520, to ensure that various portions of the work flow may be handled appropriately. Parsing may include determining that all required inputs, data, and/or materials needed for completing the work flow are available. In the event that additional inputs, data, and/or materials are needed, the work flow may be returned to the triggering device to request the additional inputs, data, and/or materials, for example. Parsing may also include aspects of load-balancing. Parsing may also include, for example, analyzing the work flow request and associated data and/or materials to ensure the data, materials and/or multiple individual sub-work flow processes are directed to an appropriate work flow processor 535, 540, 545, 550, 555, etc. Task start times may optionally be tracked based on completion of parsing a work flow request, for example.

In one embodiment, a work flow may correspond to performing a data set analysis on a sample, which may include dividing the sample into sub-samples. The sub-samples may, for example, be redundantly analyzed to ensure accuracy. Parsing 520 may include identifying necessary resources for completing a particular work flow.

After parsing the work flow request, the triggered work flow is started, at block 525. Optionally, synchronizer 530 oversees the processing of individual work flow processes by work flow processors. Optionally, tracked task start times may correspond to times at which the triggered work flow is actually passed to a work flow processor.

Some task work flows may include multiple individual work flow processes, such as a sequencing work flow for sequencing data-set unit data or sparse indicator data from a sample, where each individual work flow process may correspond to, for example, one or more data sets. These individual work flow processes may be performed in series, for example, such as if a particular work flow process requires input from a previous work flow process. The individual work flow processes may alternatively be performed in parallel, for example, if the separate work flow processes do not rely on an a result from another work flow process that may be performed simultaneously. Additionally, individual work flow processes may be started and completed without regard to other work flow processes that may be operating. Upon a work flow processor 535, 540, 545, 550, 555 completing the designated tasks, at 560, the work flow may be evaluated to determine whether the work flow is completed. If additional processing is required, the work flow may return to synchronizer 530 for appropriate queuing. If no additional processing is required, the work flow result may be forwarded as appropriate, at 565. Once a particular work flow is forwarded, the task associated with the work flow may stop, at block 570. Optionally, task stop or end times may be tracked based on the time at which a work flow proceeds to stop at block 570.

Assessment system 105 may store task start and completion times, and/or task completion time periods (i.e., a difference between corresponding task completion and task start times) in process data store 177 in association with an identifier of the corresponding task and an identifier of a corresponding work flow iteration (e.g., an identifier of a client or sample). Assessment system 105 may collect task start and completion times that correspond, for example, to a given time period, facility, user or client group, analysis type, etc. and analyze the data at a population level. Through such analysis, assessment system 105 may identify average, median, or mode completion time periods for individual tasks so as to identify tasks, facilities, or entities associated with work flow processing delay. Further or alternatively, assessment system 105 may identify a backlog for individual tasks by identifying a number of "open" tasks for which a start time has been identified but for which no completion time is identified. Tasks, facilities, and/or entities associated with high backlog may then be identified.

Such task completion time monitoring may be performed automatically and/or in response to a query communication from user device 180. For example, assessment system 105 may determine, for each handling entity (e.g., facility, distribution device, reviewer, or facility) a portion of tasks completed by a first threshold time identified for a given task. Upon detecting that the portion exceeds a second threshold, an alert communication may be transmitted to user device 180 and/or a device of an associated entity. As another example, assessment system 105 may present a statistic (e.g., mean) corresponding to a processing time of each task in a work flow. The presentation may be interactive, such that more details about a statistic may be presented in response to a user selection of the statistic. For example, the statistic may be broken down by entity and/or task start time period, or more detailed information (e.g., a distribution or list of start and completion times) may be presented.

In some instances, data transmitted from assessment system 105 to user device 180 may relate to data queries received from user device 180. The query may, in some instances, include one that specifically or implicitly identifies one or more data-set units. For example, identification of a given kit or assessment may be associated with one or more data-set units. Assessment system 105 may identify data that any access constraints indicate are accessible to the user, and present high-level population data. For example, assessment system 105 may identify a portion of clients for which any sparse indicator or a particular sparse indicator was detected at each of the one or more data-set units. Such data may be presented in an interactive manner, such that a user may select a represented portion of the data to drill down into that data. For example, the interface may accept a selection of a representation of each data-set unit, and the interface may be updated to identify a distribution of particular sparse indicators detected at the data-set unit.

A drill-down may be configured to, at some level, begin representing non-data set data. For example, a selection of a particular sparse indicator or data-set unit may result in a display identifying a distribution of history data or demographic data from amongst clients associated with the particular sparse indicator or a sparse indicator at the data-set unit. Thus, the drill-down may include retrieving data from different data stores depending on a level of precision. Further, each step in the drill-down may involve evaluating one or more applicable access constraints.

In some instances, a query may pertain to one or more data-set units, and query processing may include retrieving data (or results derived therefrom) and retrieving data set availability data (or results derived therefrom). For example, query processing may include identifying, for each subject and for each of the one or more data-set units, whether a sparse indicator or an data set availability modification was detected. A query result presentation may identify, for example, a portion of subjects for which a sparse indicator or modification was detected for each of the data-set units and/or a query result presentation may identify, for each of the one or more data-set units, a portion of subjects or clients for which a particular type of sparse indicator or modification was detected. The presentation may again be configured to accept drill-down inputs so as to enable a user to further explore the pertinent data.

As another example, query processing may include identifying instances in which, for a given client, both a sparse indicator (e.g., generally or of a particular type) and an data set availability modification (e.g., generally or of a particular type) was detected (e.g., generally, at a particular data-set unit and/or at a particular position at a data-set unit).

Again with reference to FIG. 1, assessment network 100 may also include an external assessment device 190 configured to detect input from a developer 195. Via such inputs, external assessment device 190 may send electronic requests for data (e.g., relating to particular data-set units, a particular user or client and/or particular user or client inputs) to assessment system 105. The inputs may be received, for example, via a webpage, application, or app page, which may identify general types of data that is available for restricted access. Assessment system 105 may evaluate the request to determine, for example, whether a corresponding client 125 authorized such access (which may be verified via a communication exchange between assessment system 105 and client device 130) and/or whether such access is relevant to a purported type of analysis.

The evaluation may include assessing one or more permissions associated with a given user or client. In various instances, a permission may be set to be conditioned upon an entity or system transmitting a request, a type of data being requested, a size of data being requested, or a potential type of processing identified as being a use for the data. For example, a client may specify that an external assessment device may be granted access to data, such as data that includes data sets or sparse indicator detections, if the requested data pertains to fewer than a first threshold number of data-set units, that access to data that includes sparse indicator detection may be granted if the requested data pertains to fewer than a second threshold number of data-set units, and that access to the data is to be otherwise restricted.

Evaluation processing may depend, in part, on whether a system or entity associated with a request has provided any data previously or presently and/or what type of data is being provided. For example, external assessment devices and/or associated systems may provide data (e.g., generated from an external facility and/or client sample), results data, input data, data set availability data, test data, and/or history data.

Evaluation processing may depend on one or more permissions or restrictions associated with a request. The permissions or restrictions may be set, for example, based on client input, or lack thereof, and/or based on which type of analysis and/or data storage was initially agreed to by a client. For example, an interface may be configured so as to enable a user or client to permit or restrict storage of particular types of data (e.g., data sets and/or sparse indicator detection beyond what is needed to perform a requested analysis), to permit or restrict sharing data to one or more other entities (e.g., generally, of a given type or specific entities), and/or to permit or restrict using data to perform one or more other types of analyses. Permissions or restrictions pertaining to whether various analyses may be particularly important given that rules or regulations may require particular results of analyses to be transmitted to a client. Thus, if such information is not desired, analyses must be restricted.

In some instances, an interface may be configured to enable a user or client to specify a degree of identification to be associated with data of the client with regard to storage and/or distribution. For example, a user or client may be able to indicate that data and/or results are to be associated with a pseudo-randomly generated unique identifier of the client rather than client identifying information. As another example, a client may be able to indicate that data is to be stored so as to require a key for access, which may be held by the client. As another example, a client may authorize transmission of the client's data to external assessment devices so long as identifying information of the client (e.g., name, email, address, social security number, phone number, and so on) is not provided without subsequent explicit permission.

In some instances, a same or different permission may be established to apply to other type of data (e.g., with regard to storage and/or distribution), such as personal data, inputs and/or sensor data. In some instances, a same or different permission may be established so as to relate to data collected from external systems. For example, a permission may indicate whether an assessment system is authorized to request physician-system data (and/or what type of data), an external assessment device-data, etc., and/or how an assessment is to handle results provided by an external system.

If the evaluation indicates that access is to be granted, assessment system 105 may, for example, send an instruction communication to data generator 140 to conduct a new analysis of an existing sample, send a data request to a device (e.g., access control device 160b, client device 130), and/or retrieve data from a data store (e.g., and extract pertinent information from any larger data structure, such as extracting data-set unit-specific data from a reference dataset). When part or all of the data is accessible, one or more communications may be transmitted to the developer. The one or more meetings may include the data and/or may include information (e.g., access credentials, login information, or ftp IP address and credential information) to enable the developer to access the data. In some instances, other data different from that which was requested may be provided. The other data may include, for example, quality control metrics of the provided data, other data determined to be relevant to an analysis, and/or other data that is being provided in lieu part or all of data that had been requested.

Various devices in assessment network 100 may communicate with one or more other devices in assessment network 100 via a network, such as a communication system, the Internet, a local-area network, or a short-range network. Communications may be sent in a secure manner to, e.g., inhibit unauthorized access to health-record data. Techniques such as token authentication and/or encryption may be used.

It will be appreciated that the representations of devices and configurations depicted in FIGS. 1, 2, and 3 are illustrative. For example, while a single data generator 140, client device 130, and data stores 178, etc., are shown, a system may include multiple data generators 140, client devices 130, data store 178, etc. As another example, while access control devices 160a, 160b are shown as being connected to data store 155 and record data store 165, additional access control devices may be present in assessment network 100. For example, an access control device 105 may be included within or connected to assessment system 105 so as to control access that requestor device 110b, client device 130, distribution device 135, evaluation device 170, user device 180 and/or external assessment device 190 may achieve.

Figure 6:
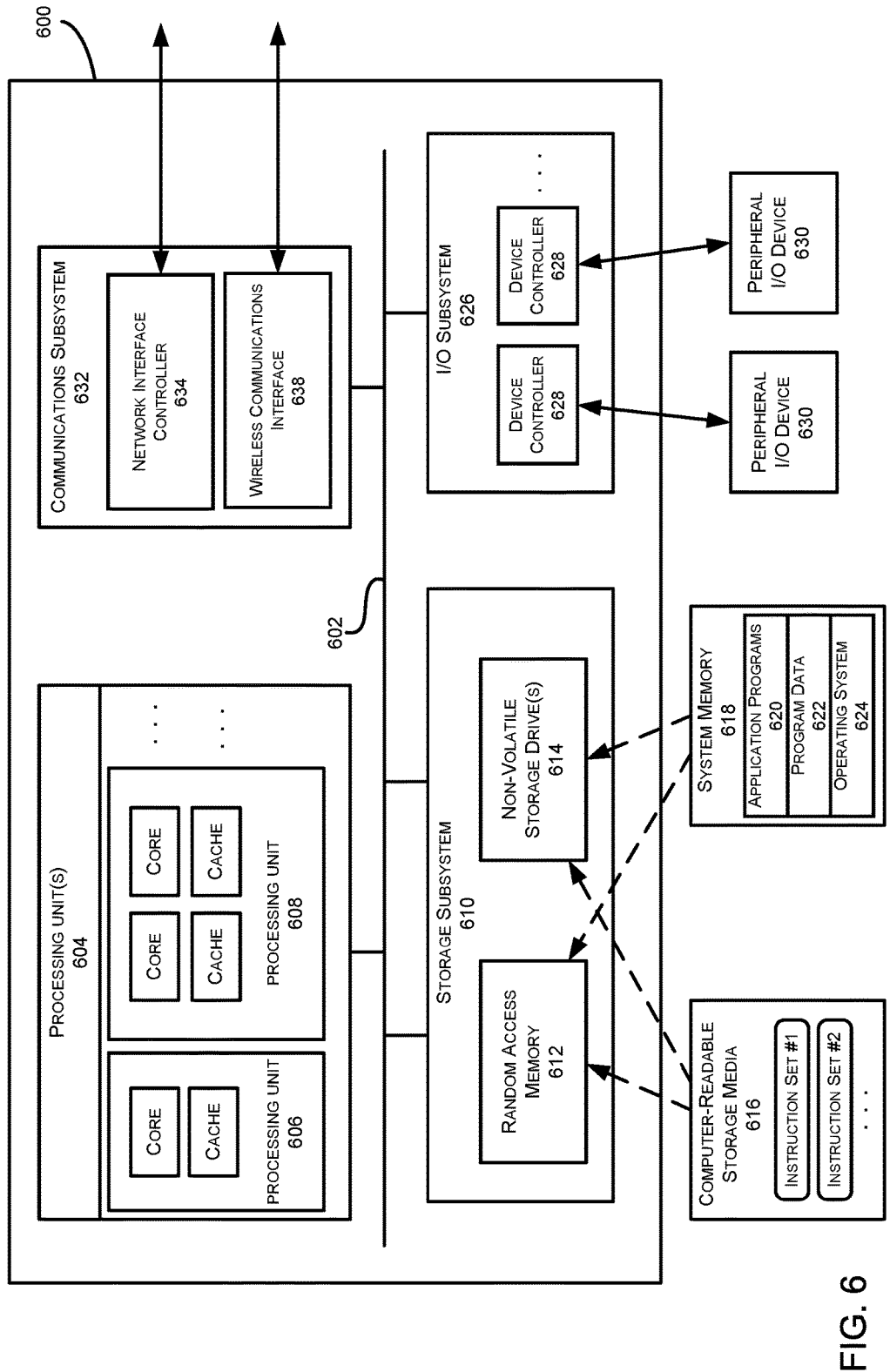
FIG. 6 shows a block diagram of an example data processing network device or system, in accordance with some embodiments.

With reference now to FIG. 6, a block diagram of an illustrative assessment network device 600 is shown. The device 600 may correspond to any of the devices or systems of the assessment network 100 described above, or any other computing devices described herein, and specifically may include, for example, one or several of an assessment system 105, a requestor device 110, a client device 130, a distribution device 135, an assessment device 145, a technician device 150, an access control device 160a, a reviewer device 180, an external assessment device 190, external system 249, data-characterizer device 410, data set analyzer 420, and/or any of the work flow processors 535, 540, 545, 550, and 555. Aspects of device 600 may further be incorporated in one or more of data stores 155, 165, 176, 177, 178, 181, 182, 183, 415, 425, and 430 and data store 372. It will be appreciated that each of the devices referred to that may correspond to an instance of device 600 may be independent and unique from all other instances of device 600 and may include fewer or additional components as those illustrated in FIG. 6.

In the example illustrated in FIG. 6, device 600 includes processing units 604 that communicate with a number of peripheral subsystems via a bus subsystem 602. These peripheral subsystems include, for example, a storage subsystem 610, an I/O subsystem 626, and a communications subsystem 632.

Bus subsystem 602 provides a mechanism for letting the various components and subsystems of device 600 communicate with each other. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard.

Processing unit 604, which may be implemented as one or more integrated circuits (e.g., a conventional microprocessor or microcontroller), controls the operation of device 600. Processing unit 604 may be implemented as a special purpose processor, such an application-specific integrated circuit, which may be customized for a particular use and not usable for general-purpose use. One or more processors, including single core and/or multicore processors, may be included in processing unit 604. As shown in FIG. 6, processing unit 604 may be implemented as one or more independent processing units 606 and/or 608 with single or multicore processors and processor caches included in each processing unit. In other embodiments, processing unit 604 may also be implemented as a quad-core processing unit or larger multicore designs (e.g., hexa-core processors, octo-core processors, ten-core processors, or greater).

Processing unit 604 may execute a variety of software processes embodied in program code, and may maintain multiple concurrently executing programs or processes. At any given time, some or all of the program code to be executed may be resident in processor(s) 604 and/or in storage subsystem 610. In some embodiments, device 600 may include one or more specialized processors, such as digital signal processors (DSPs), outboard processors, graphics processors, application-specific processors, and/or the like.

I/O subsystem 626 may include device controllers 628 for one or more user interface input devices and/or user interface output devices 630. User interface input and output devices 630 may be integral with device 600 (e.g., integrated audio/video systems, and/or touchscreen displays), or may be separate peripheral devices which are attachable/detachable from device 600. The I/O subsystem 626 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 630 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 630 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, haptic devices, and eye gaze tracking devices. Additional input devices 630 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 630 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, haptic devices, and the like. In general, use of the term "output device" is intended to include all possible types of devices and mechanisms for outputting information from device 600 to a user or other computer. For example, output devices 630 may include, without limitation, a variety of display devices that visually convey text, graphics and audio/video information such as monitors, printers, speakers, headphones, automotive navigation systems, plotters, voice output devices, and modems.

Device 600 may comprise one or more storage subsystems 610, comprising hardware and software components used for storing data and program instructions, such as system memory 618 and computer-readable storage media 616. The system memory 618 and/or computer-readable storage media 616 may store program instructions that are loadable and executable on processing units 604, as well as data generated during the execution of these programs. Program instructions may include instructions to perform one or more actions or part(s) or all of one or more methods or processes described herein. For example, program instructions may include instructions for identifying and/or aligning sparse indicators. Program instructions may include instructions for generating, transmitting, and/or receiving communications. Program instructions may include instructions for automated processing. Program instructions may include instructions for generating automated processing and/or stage results. Program instructions may include instructions for performing a work flow iteration.

Depending on the configuration and type of device 600, system memory 618 may be stored in volatile memory (such as random access memory (RAM) 512) and/or in non-volatile storage drives 614 (such as read-only memory (ROM), flash memory, etc.) The RAM 612 may contain data and/or program modules that are immediately accessible to and/or presently being operated and executed by processing units 604. In some implementations, system memory 618 may include multiple different types of memory, such as static random access memory (SRAM) or dynamic random access memory (DRAM). In some implementations, a basic input/output system (BIOS), containing the basic routines that help to transfer information between elements within device 600, such as during start-up, may typically be stored in the non-volatile storage drives 614. By way of example, and not limitation, system memory 618 may include application programs 620, such as user applications, Web browsers, mid-tier applications, server applications, etc., program data 622, and an operating system 624.

Storage subsystem 610 also may provide one or more tangible computer-readable storage media 616 for storing the basic programming and data constructs that provide the functionality of some embodiments. Software (programs, code modules, instructions) that when executed by a processor provide the functionality described herein may be stored in storage subsystem 610. These software modules or instructions may be executed by processing units 604. Storage subsystem 610 may also provide a repository for storing data used in accordance with the present invention.

Storage subsystem 610 may also include a computer-readable storage media reader that may further be connected to computer-readable storage media 616. Together and, optionally, in combination with system memory 618, computer-readable storage media 616 may comprehensively represent remote, local, fixed, and/or removable storage devices plus storage media for temporarily and/or more permanently containing, storing, transmitting, and retrieving computer-readable information.

Computer-readable storage media 616 containing program code, or portions of program code, may include any appropriate media known or used in the art, including storage media and communication media, such as but not limited to, volatile and non-volatile, removable and non-removable media implemented in any method or technology for storage and/or transmission of information. This may include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This may also include nontangible computer-readable media, such as data signals, data transmissions, or any other medium that may be used to transmit the desired information and that may be accessed by device 600.

By way of example, computer-readable storage media 616 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray disk, or other optical media. Computer-readable storage media 616 may include, but is not limited to, Zip drives, flash memory cards, universal serial bus (USB) flash drives, secure digital (SD) cards, DVD disks, digital video tape, and the like. Computer-readable storage media 616 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for device 600.

Communications subsystem 632 may provide a communication interface from device 600 and remote computing devices via one or more communication networks, including local area networks (LANs), wide area networks (WANs) (e.g., the Internet), and various wireless telecommunications networks. As illustrated in FIG. 6, the communications subsystem 632 may include, for example, one or more network interface controllers (NICs) 634, such as Ethernet cards, Asynchronous Transfer Mode NICs, Token Ring NICs, and the like, as well as one or more wireless communications interfaces 638, such as wireless network interface controllers (WNICs), wireless network adapters, and the like. Additionally and/or alternatively, the communications subsystem 632 may include one or more modems (telephone, satellite, cable, ISDN), synchronous or asynchronous digital subscriber line (DSL) units, FireWire interfaces, USB interfaces, and the like. Communications subsystem 632 also may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components.

The various physical components of the communications subsystem 632 may be detachable components coupled to the device 600 via a computer network, a FireWire bus, a serial bus, or the like, and/or may be physically integrated onto a motherboard or circuit board of device 600. Communications subsystem 632 also may be implemented in whole or in part by software.

In some embodiments, communications subsystem 632 may also receive input communication in the form of structured and/or unstructured data feeds, event streams, event updates, and the like, on behalf of one or more users who may use or access device 600. For example, communications subsystem 632 may be configured to receive data feeds in real-time from other communication services, web feeds such as Rich Site Summary (RSS) feeds, and/or real-time updates from one or more third party information sources. Additionally, communications subsystem 632 may be configured to receive data in the form of continuous data streams, which may include event streams of real-time events and/or event updates (e.g., data set completion, results transmission, other data transmission, report transmission, etc.). Communications subsystem 632 may output such structured and/or unstructured data feeds, event streams, event updates, and the like to one or more data stores that may be in communication with device 600.

Due to the ever-changing nature of computers and networks, the description of device 600 depicted in FIG. 6 is intended only as a specific example. Many other configurations having more or fewer components than the device depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, it will be appreciated that there are other ways and/or methods to implement the various embodiments.

Figure 7:
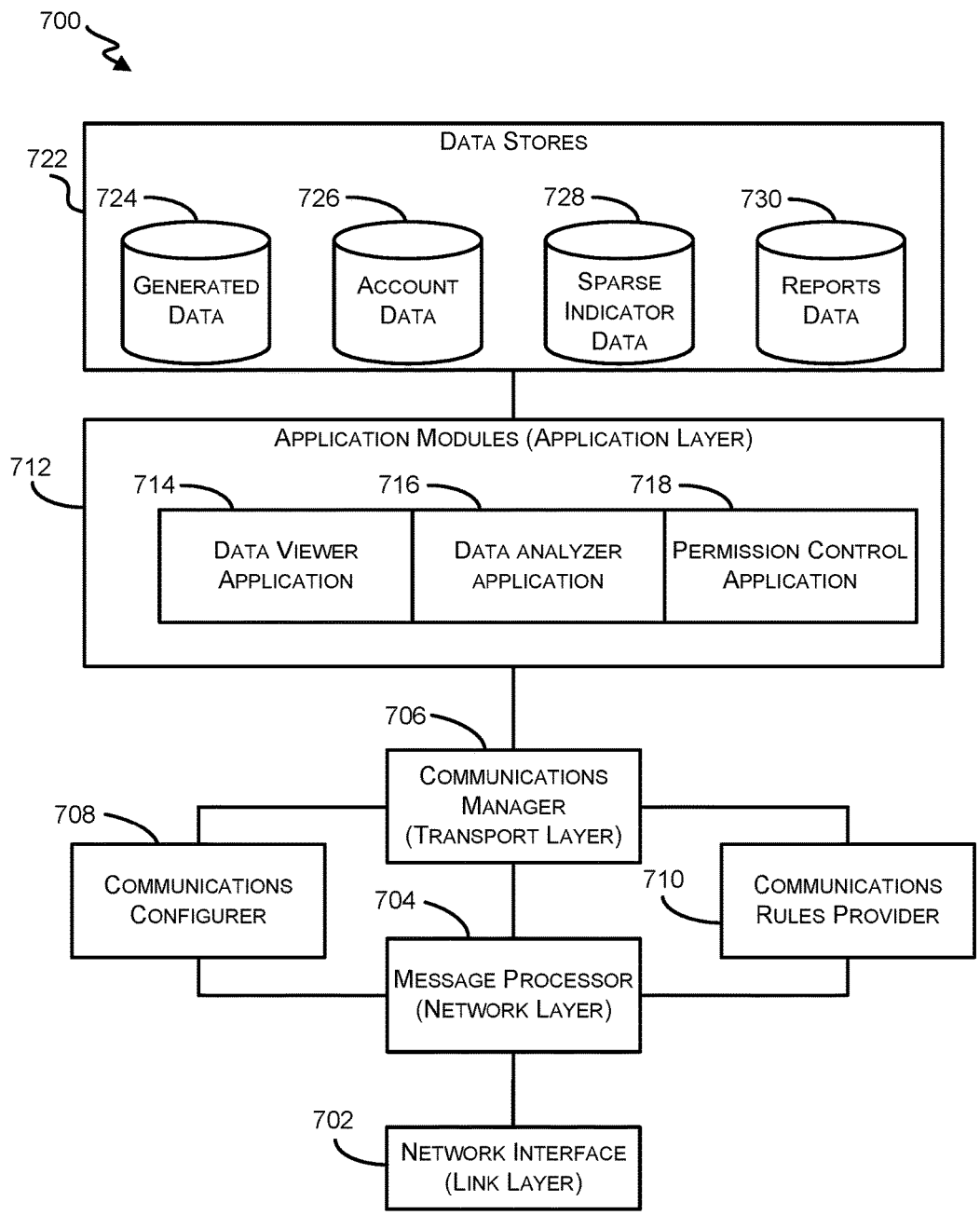
FIG. 7 illustrates components of a data processing network device or system, in accordance with some embodiments.

With reference now to FIG. 7, a diagram of components of an illustrative assessment network device 700 is shown. The device 700 may correspond to any of the devices or systems of the assessment network 100 described above, or any other computing devices described herein, and specifically may include, for example, one or several of an assessment system 105, a requestor device 110, a client device 130, a distribution device 135, an assessment device 145, a technician device 150, an access control device 160a, a reviewer device 180, an external assessment device 190, external system 249, data-characterizer device 410, data set analyzer 420, any of the work flow processors 535, 540, 545, 550, and 555, and/or device 600. Aspects of device 700 may further be incorporated in one or more of data stores 155, 165, 176, 177, 178, 181, 182, 183, 415, 425, and 430, and data store 372. It will be appreciated that each of the devices referred to that may correspond to an instance of device 700 may be independent and unique from all other instances of device 700 and may include fewer or additional components as those illustrated in FIG. 7.

Various components may be included in device 700. Components may include some or all of the following: a network interface 702 (which may operate in or function as a link layer of a protocol stack), a message processor 704 (which may operate in or function as a network layer of a protocol stack), a communications manager 706 (which may operate in or function as a transport layer of a protocol stack), a communications configurer 708 (which may operate in or function as a portion of transport and/or network layer in a protocol stack), a communications rules provider 710 (which may operate in or function as part of a transport and/or network layer in a protocol stack), and applications 712 (which may operate in or function as an application layer of a protocol stack).

Network interface 702 receives and transmits messages via one or more hardware components that provide a link-layer interconnect. The hardware components associated with network interface 702 may include, for example, a radio frequency (RF) antenna or a port (e.g., Ethernet port) and supporting circuitry. In some embodiments, network interface 702 may be configured to support wireless communication, e.g., using Wi-Fi (IEEE 802.11 family standards), Bluetooth, or other wireless communications standards.

The RF antenna, if present, may be configured to convert electric signals into radio and/or magnetic signals (e.g., to radio waves) to transmit to another device and/or to receive radio and/or magnetic signals and convert them to electric signals. RF antenna may be tuned to operate within a particular frequency band. In some instances, device 700 includes multiple antennas, and the antennas may be, for example, physically separated. In some instances, antennas differ with respect to radiation patterns, polarizations, take-off angle gain and/or tuning bands. Network interface 702 may include one or more phase shifters, filters, attenuators, amplifiers, switches and/or other components to demodulate received signals, coordinate signal transmission and/or facilitate high-quality signal transmission and receipt using the RF antenna.

In some instances, network interface 702 includes a virtual network interface, so as to enable the device to utilize an intermediate device for signal transmission or reception. For example, network interface 702 may include or utilize virtual private networking (VPN) software.

Network interface 702 may be configured to transmit and receive signals over one or more connection types. For example, network interface may be configured to transmit and receive Wi-Fi signals, Ethernet signals, cellular signals, Bluetooth signals, etc.

Message processor 704 may coordinate communication with other electronic devices or systems, such as one or more user devices, requestor devices, assessment systems, data stores, assessment devices, distribution device, reviewer device, etc. In one instance, message processor 704 is able to communicate using a plurality of protocols (e.g., any known, future and/or convenient protocol such as, but not limited to, internet protocol (IP), short message service, (SMS), multimedia message service (MMS), etc.). Message processor 704 may further optionally serialize incoming and/or outgoing messages and facilitate queuing of incoming and outgoing message traffic.

Message processor 704 may perform functions of an Internet or network layer in a network protocol stack. For example, in some instances, message processor 704 may format data packets or segments, combine data packet fragments, fragment data packets and/or identify destination applications and/or device addresses. For example, message processor 704 may defragment and analyze an incoming message to determine whether it is to be forwarded to another device and, if so, may address and fragment the message before sending it to the network interface 702 to be transmitted. As another example, message processor 704 may defragment and analyze an incoming message to identify a destination application that is to receive the message and may then direct the message (e.g., via a transport layer) to the application.

Communications manager 706 may implement transport-layer functions. For example, communications manager 706 may identify a transport protocol for an outgoing message (e.g., transmission control protocol (TCP) or user diagram protocol (UDP)) and appropriately encapsulate the message into transport protocol data units. Message processor 704 may initiate establishment of connections between devices, monitor transmissions failures, control data transmission rates, and monitor transmission quality. As another example, communications manager 706 may read a header of an incoming message to identify an application layer protocol used to receive the message's data. The data may be separated from the header and sent to the appropriate application. Message processor 704 may also monitor the quality of incoming messages, detect out of order incoming packets, detect missing packets, reorder out of order packets, request retransmission of missing packets, request retransmission of out of order packets, etc.

In some instances, characteristics of message-receipt or message-transmission quality may be used to identify a quality status of an established communications link. In some instances, communications manager 706 may be configured to detect signals indicating the stability of an established communications link (e.g., a periodic signal from the other device system, which if received without dropouts, indicates a stable link).

In some instances, a communication configurer 708 is provided to track attributes of another system so as to facilitate establishment of a communication session. In one embodiment, communication configurer 708 further ensures that inter-device communications are conducted in accordance with the identified communication attributes and/or rules. Communication configurer 708 may maintain an updated record of the communication attributes of one or more devices or systems. In one embodiment, communications configurer 708 ensures that communications manager 706 may deliver the payload provided by message processor 704 to the destination (e.g., by ensuring that the correct protocol corresponding to the receiving system is used). Optionally, communications configurer 708 may reformat, encapsulate, or otherwise modify the messages directed to the message processor 704 to ensure that the message processor 704 is able to adequately facilitate transmission of the messages to their ultimate destination.

A communications rules provider 710 may implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule may identify a technique for selecting between a set of potential destination devices based on attributes of the set of potential destination devices as tracked by communication configure 708. To illustrate, a device having a short response latency may be selected as a destination device. As another example, communications rules provider 710 may maintain associations between various devices or systems and resources.

Thus, messages corresponding to particular resources may be selectively transmitted to destinations having access to such resources.

A variety of applications 712 may be configured to initiate message transmission, process incoming transmissions, facilitate permissions requests for access to protected data, facilitate automatic access to protected data, facilitate task work flow permission verification, and/or performing other functions. In the instance depicted in FIG. 7, application modules 712 include a data viewer application 714, a data analyzer application 716, and/or a permission control application 718. It will be appreciated that the application modules depicted in FIG. 7 are merely examples and other example application modules are include, but are not limited to, one that is associated with aspects of part or all of each of one or more actions, methods, and/or processes disclosed herein.

Data stores 722 may store data for use by application modules 712, as necessary, and may include, for example, generated data store 724, account data store 726, sparse indicator data store 728, and reports data store 730. Optionally, data store 372 may be included in data stores 722. It will be appreciated that fewer or more or different data stores than those illustrated in FIG. 7 may be included in data stores 722, such as any one or more of data stores 155, 165, 176, 177, 178, 181, 182, and 183 depicted in FIG. 1.

One or more of data stores 724, 726, 728, and 730 may be a relational data store, such that elements in one data store may be referenced within another data store. For example, account data store 726 may associate an identifier of a particular account with an identifier of a particular user or client. Additional information about the user may then be retrieved by looking up the account identifier in sparse indicator data store 728, for example.

The components illustrated in FIG. 7 may be useful for establishing data communications and exchanging data between various other systems. For example, independent instances of device 700 may represent the requestor device 110 and the assessment system 105 illustrated in FIGS. 1 and 2. Other examples are possible.

As an example, data analyzer application 716 may perform alignment of data sets, request reference data, determine sparse indicators, determine scores, determine buckets, etc. Such actions may be performed in response to messages received by device 700 from another instance of device 700. If data that is unavailable locally in device 700 is needed by an application module 712, a request may be transmitted by device 700, first by generating the request, forwarding the request to communications manager 706, which then may process and modify the request as necessary for subsequent handling by message processor 704. In turn, message processor 704 may process and modify the request as necessary, such as by adding header and/or footer information, for subsequent handling by network interface 702. Network interface 702 may then perform further processing and modification of the request, such as by adding additional header and/or footer information, and then facilitate transmission of the request to a remote system, such as an external system that may possess the needed data.

Figure 8:
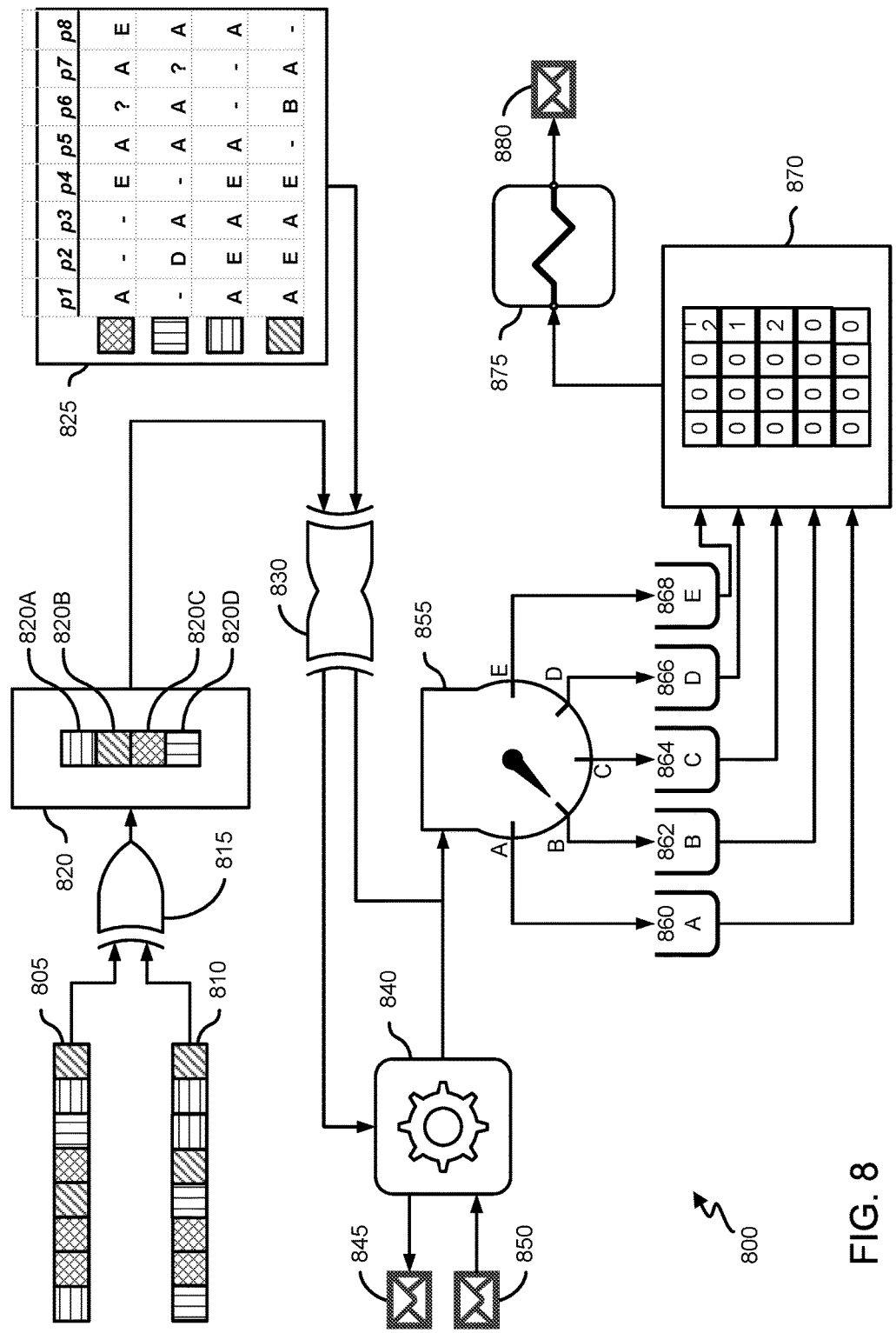
FIG. 8 shows a representation of a system for generating communications, in accordance with some embodiments.

Referring next to FIG. 8, a representation of a system 800 for assigning sparse indicators to data buckets is shown, such as by performing a work flow iteration(s), performing automated processing for stage(s), generating stage result(s) from one or more stages of a work flow, and analyzing data buckets. System 800 may represent portions of assessment system 105 and may, for example, include portions of data generator 140. System 800 may be in data communication with one or more other components of assessment network 100 or 300, such as client device 130 and data store 372, for example.

System 800 includes an assessment device 815, which may be used to analyze and/or compare generated data 805 with reference data 810 to generate a data stream 820, which may include one or more sparse indicators 820A, 820B, 820C, 820D, etc. Thus, it will be appreciated that data 805 may include data aligned with a portion of a reference set, such that individual values of data 805 may be compared to corresponding values in reference data 810. In some embodiments, multiple individual data sets are obtained for a particular client and a compiled data set may be assembled from alignments of a plurality of the individual data sets. The compiled data set may be compared with one or more reference data sets or a compiled reference data set to identify sparse indicators associated with the compiled data set for the particular client. It will also be appreciated that generated data 805 may include identifier data and coverage data that may be used by assessment device 815 in generating data stream 820, such as by comparing identifier data with reference data 810 and using coverage data in tandem to determine a type, identity, value, and/or confidence metric associated with a sparse indicator in data stream 820.

Different types of sparse indicators may be identified, such as a one-element sparse indicator representing a single data element different from a reference data set, or a clustered sparse indicator representing a set of consecutive data elements different from a reference data set. A clustered sparse indicator may be detected upon determining (for example) that a series of elements in a data set generally differ from those in a reference data set or that values in a coverage set change across the set so as to indicate that a portion of the reference data set is over- or underrepresented in the data set. Thus, in some instances, a reference set may include a reference coverage set. Although only four sparse indicators 820A-820D are depicted as part of data stream 820, it will be appreciated that more or fewer sparse indicators may be identified for a particular set of generated data and that the four sparse indicators 820A-820D are merely examples.

System 800 further includes a look-up engine 830, which may determine whether each individual sparse indicator corresponds to bucket-assignment data in stored data 825 (e.g., a look-up table). For example, a look-up table may include a set of entries, each of which corresponds to a sparse indicator. A sparse indicator may be identified (for example) by a position and identifier or by a range of positions and type of sparse identifier (e.g., type of structural sparse identifier and/or one or more corresponding position ranges in a reference data set). For example, FIG. 8 illustrates stored data 825 arranged in a table or array, such that a value along a first dimension can represent an identifier detected in a client data set and a value along a second dimension can represent a position at which the identifier was detected. Elements that correspond to those in a reference data set need not have a value. Each of one or more other elements may include bucket-assignment data, which may identify a bucket to which the sparse indicator is to be assigned and, in some instances, a confidence of such assignment. In some instances, one or more elements indicate that bucket-assignment data is not yet available).

The depicted stored data 825 may be useful for identifying bucket-assignment data for sparse indicators corresponding to differences between a client data set and reference data set at individual positions. It will be appreciated that additional stored data 825 may identify bucket-assignment for other types of sparse indicators (e.g., structural sparse indicators), such as a sparse indicator that indicates that elements from Position X to Position Y are not present in a client data set.

If a look-up of a particular sparse indicator is successful, look-up engine 830 may proceed to assign the sparse indicator in accordance with the bucket-assignment data. If a look-up of the particular sparse indicator is not successful or if a work flow calls for additional stages, the information associated with the sparse indicator and/or the result(s) from the look-up may be directed to data processor 840.

Look-up engine 830 may further allow for filtering of sparse indicators, such as to determine when a reviewer-assisted analysis of a particular sparse indicator is not needed or not to be performed. For example, some sparse indicators may be pre-assigned to particular data bucket(s) and look-up engine may identify these sparse indicators as such. In another example, some sparse indicators may not be suitable for an iterative analysis and/or may be predetermined such that no resources are to be used in analyzing the sparse indicator. For example, some sparse indicators are associated with a position in a full data set for which analysis is determined to be unnecessary. Optionally, some sparse indicators are associated with a position in a full data set and value for which analysis is determined to be unnecessary.

System 800 further includes a data processor 840, which may perform iterative performance of automated processing for each of the sparse indicators in data stream 820. It will be appreciated that more data processors 840 may be included in system 800, such as to allow parallel and/or sequential work flow performance. Data processor 840 may perform fully automated processing of stages of a work flow and forward stage result(s) to bucketor 855 for data bucket assignment.

In some embodiments of automated processing for one or more sparse indicators, data processor 840 may encounter one or more stages having a stage-progression condition that is not satisfied or may determine that a reviewer-engagement condition is satisfied (e.g., due to a failure to identify a bucket for a sparse indicator in a look-up data store or due to determining that a bucket assignment for a sparse indicator is associated with a confidence metric that is below a predefined quantitative or qualitative threshold). Optionally, data processor 840 may generate and transmit a query communication 845 that includes one or more of a position associated with a sparse indicator, one or more values associated with the sparse indicator, and a result(s) from a previous stage of the work flow. The query communication 845 may be transmitted, for example, from system 800 to an evaluation device 170 to facilitate review and/or input by evaluator 175. For example, evaluation device 170 may receive the query communication 845 and display the included information to allow the evaluator 175 to provide response data to satisfy the stage-progression condition. Evaluation device 170 may then generate a response communication 850 that includes response data. Data processor 840 may receive response communication 850 and use the included response data to complete or augment the automated processing to generate stage result(s). Once the stages are completed according to the work flow, stage result(s) may be forward to bucketor 855.

System 800 further includes bucketor 855, which may assign each sparse indicator to a bucket of a plurality of data buckets, such as by using stage result(s) from data processor 840 and/or look-up result(s) from look-up engine 830. Bucketor 855 may then assign a particular data bucket for the particular sparse indicator being analyzed. It will be appreciated that more bucketors 855 may be included in system 800. In system 800, five data buckets 860, 862, 864, 866, and 868 are depicted, though it will be appreciated that more or fewer data buckets may be utilized. Some or all of data buckets 860-868 may, for example, span a range along a spectrum of a degree of likeliness that a client will transition into or experience a particular state. Upon full or partial completion of the assignment of the sparse indicators in data stream 820 to data buckets, information may be passed to bucket assessor 870. It will be appreciated that counts assigned to a set of buckets may be determined with respect to each of multiple position ranges (or units) or combinations thereof. For example, for a given data set, a count may be generated for each of a set of buckets and for each of a set of units that reflects a number of sparse indicators detected for the unit that correspond to the bucket.

System 800 further includes bucket assessor 870. Although bucket assessor 870 is shown schematically as a separate component from bucketor 855, it will be appreciated that bucket assessor 870 and bucketor 855 may be combined in a single component or process. Bucket assessor 870 may identify a number of sparse indicators assigned to particular buckets 860-868 using one or more counters, for example. Bucket assessor 870 may optionally determine whether one or more buckets include counts above a predetermined threshold (e.g., whether a count exceeds zero). The predetermined threshold may be (for example) defined by a user, generated based on machine learning, generated based on a virtual structural representor, and/or generated based on a population analysis. For example, in one instance, it may be determined whether a count in a given bucket or a total count across a combination of buckets (e.g., a bucket corresponding to a highest predicted likelihood, amongst the buckets, of transitioning into or being in a particular state or two buckets corresponding to the two highest predicted likelihoods) exceeds zero. It will be appreciated that predetermined thresholds for each data bucket may be independent of other predetermined thresholds. Bucket assessor 870 may forward the counts corresponding to the buckets 860-868 to signal generator 875.

A signal generator 875 may use the counts and/or results of a threshold comparison, for example, to generate a communication 880 indicative of whether a number of sparse indicators assigned to particular data buckets exceed the predetermined threshold(s). In some embodiments, different templates for communication 880 may be used depending on which data bucket(s) exceed the predetermined threshold(s) and or by how much a threshold(s) is exceeded, for example. Communication 880 may identify, for example, whether one or more sparse indicators are assigned to a bucket representing a highest probability, amongst the buckets, of transitioning into or being at a particular state. Communication 880 may identify, for example, whether one or more sparse indicators are assigned to each of one or more other buckets.

Figure 9:
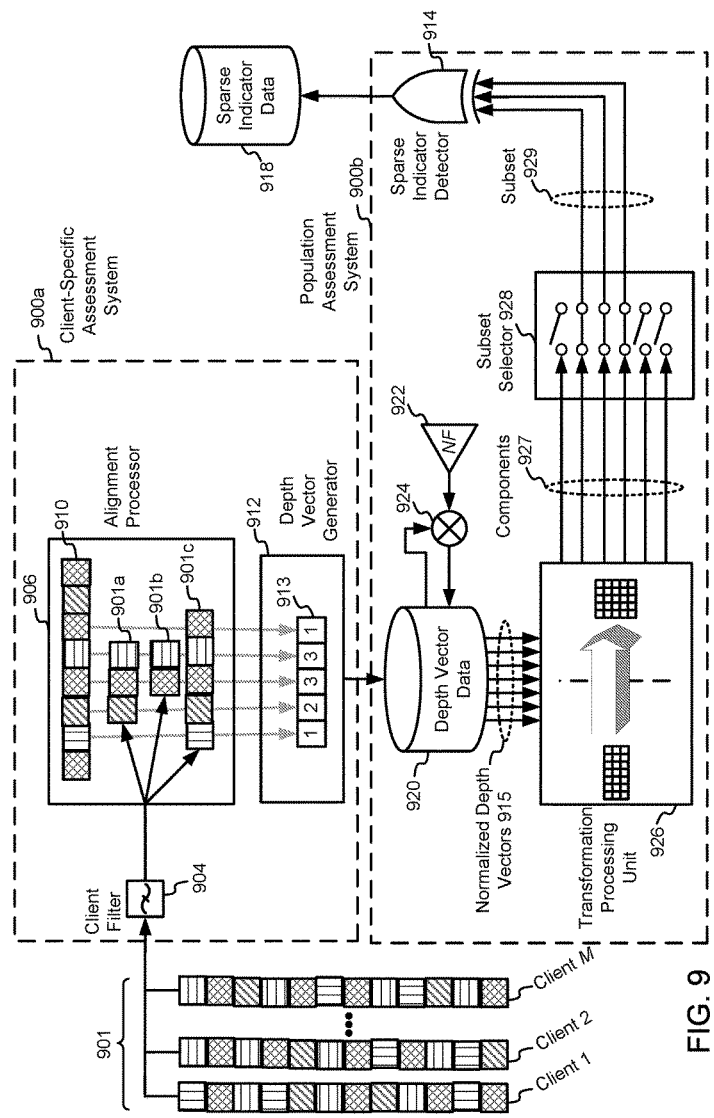
FIG. 9 shows a representation of an assessment system, in accordance with some embodiments.

Referring next to FIG. 9, a representation of an assessment system 900 for generating and transforming depth vectors for sparse-indicator detection is shown, in accordance with some embodiments. Specifically, in addition to other types of sparse-indicators described herein, assessment system 900 may identify sparse indicators that correspond to duplications or deletions associated with a client data set. Assessment system 900 may include a client-specific assessment system 900*a* for processing data (e.g., reads) related to a single client and a population assessment system 900*b* for processing data related to multiple clients. Assessment system 900 may represent portions of assessment systems 105 and 305 and may, for example, include portions of data generators 140 and 340. Assessment system 900 may be in data communication with one or more other components of assessment network 100 or 300, such as client device 130 and data store 372, for example.

In some instances, a plurality of reads 901 are received at assessment system 900 from a data source such as data generator 140. Different sets or groupings of reads 901 may correspond to different clients, for example, each of reads 901 may correspond to one of M different clients (e.g., client 1, client 2, ..., client M). Reads 901 may be transmitted to assessment system 900 in a batch-mode, in a streamlining mode, in real-time as each read is produced, and/or upon request. Reads 901 may also be stored at a data store local or remote to data generator 140. In some instances, a client filter 904 may detect and/or extract each of reads 901 that correspond to a particular client. The detection may include detecting each of reads 901 and extracting a plurality of identifiers associated with each of reads 901. It will be appreciated that, in one instance, assessment system 900 may include multiple client filters so as to detect data from each of multiple clients, or a single client filter may be configured to detect which of multiple clients a read corresponds.

Assessment system 900 may include an alignment processor 906 for aligning reads to a corresponding portion of a reference data set 910. In some instances, reference data set 910 includes a set of identifiers associated with an order along a dimension (e.g., a vector of identifiers). The portion can correspond to a subset (e.g., of consecutive positions) of the set of identifiers. Thus, for example, the portion may be defined by a start position, end position, position range and/or length. In some instances, the portion can correspond to, for example, part or all of one or more units of reference data set 910 (e.g., each of which may be associated with part of the set of identifiers). It will be appreciated that, with respect to data for a particular client, reads 901 may be aligned to corresponding portions of reference data set 910 concurrently, in batch mode, as data is received and/or in response to detecting satisfaction of another condition.

As reads 901 are aligned in alignment processor 906, client-specific assessment system 900a may generate and/or update a client data set. For example, the client data set may be generated and/or updated in response to alignment of each read, in response to alignment of at least a threshold number of reads, in response to alignment of all reads, at defined time intervals, etc. The client data set may be generated and/or updated prior to receiving and/or aligning all reads from a given processing associated with a client and/or in real-time as reads for a client are aligned.

Alignment processor 906 may send alignment data to a depth vector generator 912 which may generate a depth vector 913 corresponding to a client. Depth vector 913 may identify, for each position of reference data 910 (or for some smaller subset of positions), a quantity of reads 901 that include an element that is aligned to that particular position. For example, depth vector 913 may include the same number of elements as reference data set 910 or fewer elements than reference data set 910. In the embodiment shown in FIG. 9, depth vector includes 5 elements and reference data set 910 includes 8 elements (i.e., identifiers). In some instances, each of depth vectors 913 (each corresponding to a different client) have the same number of elements, which may be referred to herein as N. Depth vector 913 may be updated with each additional read that is processed, and may be updated simultaneously with updating a client data set in real-time. For example, as new reads are received by client-specific assessment system 900a, the depth vector corresponding to the client for which the new correspond may be retrieved (from depth vector data store 920) and updated using the new reads. Depth vector 913 may be similar to other coverage vectors described herein.

Depth vectors 913 corresponding to each of the M clients are sent to a depth vector data store 920 where they are stored, updated, and converted into M normalized depth vectors 915. Normalized depth vectors 915 are generated by calculating a normalization factor 922 for each of the N elements of depth vectors 913. Each of the N normalization factors 922 are calculated by averaging, for each of the N positions, the values of the M depth vectors 913 at each position, and then taking the inverse of the average. For example, assume that the following 3 depth vectors corresponding to 3 clients were generated by depth vector generator 912: [1, 2, 3, 3, 1], [2, 2, 3, 2, 1], [2, 3, 2, 4, 3] (i.e., M=3 and N=5). A first normalization factor would be $(5/3)^{-1}$, a second normalization factor would be $(7/3)^{-1}$, a third normalization factor would be $(8/3)^{-1}$, a fourth normalization factor would be $(9/3)^{-1}$, and a fifth normalization factor would be $(5/3)^{-1}$. A vector comprising normalization factors 922 would thus be [3/5, 3/7, 3/8, 1/3, 3/5]. Normalized depth vectors 915 are generated by multiplying depth vectors 913 by normalization factors 922 using multiplier 924. In the preceding example, the generated normalized depth vectors would be the following: [3/5, 6/7, 9/8, 1, 3/5], [6/5, 6/7, 9/8, 2/3, 3/5], [6/7, 9/7, 6/8, 4/3, 9/5], which may also be expressed as [0.6, 0.86, 1.13, 1, 0.6], [1.2, 0.86, 1.13, 0.67, 0.6], [0.86, 1.29, 0.75, 1.33, 1.8].

In some embodiments, normalized depth vectors 915 are generated once a confirmation is received or generated that all of reads 901 have been received by assessment system 900. In some embodiments, normalized depth vectors 915 are initially generated upon receiving a first read of reads 901 and are continually updated with each subsequent read that is received. In some embodiments, normalized depth vectors 915 are initially generated upon receiving a first threshold amount of reads 901 and are subsequently updated upon receiving a second threshold amount. In some embodiments, normalized depth vectors 915 are not generated, but rather depth vectors 913 are used instead for subsequent processing within population assessment system 900b.

Normalized depth vectors 915 (or depth vectors 913) are sent to transformation processing unit 926 for performing a transformation processing of normalized depth vectors 915 (or depth vectors 913) to produce a plurality of components 927. In some instances, components 927 include K vectors (or are associated with K vectors), each of which may contain N component values 931. Each of components 927 are orthogonal to each other and form an orthogonal basis set. Components 927 are produced such that they account for cross-client differences in normalized depth vectors 915 (or depth vectors 913), a first component of components 927 accounting for the most cross-client differences, a second component of components 927 accounting for the second most cross-client differences, a third component of components 927 accounting for the third most cross-client differences, and continuing in such an order. The extent to which a component accounts for cross-client differences (in normalized depth vectors 915 or depth vectors 913) may be proportional or related to a component intensity 950, such that the first component has the largest component intensity 950, and the last component has the smallest component intensity.

In some instances, after the transformation processing has occurred, each of normalized depth vectors 915 (or depth vectors 913) may be recreated or approximately recreated by weighting and summing each of components 927 using a plurality of client weights 952. Therefore, the number of client weights 952 for a particular client is equal to K, the number of components in components 927. In some instances, the number of components in components 927 is less than or equal to both M and N, and may be referred to herein as K (i.e., K≤M, N). In some instances, the number of components in components 927 is equal to the number of elements in each of depth vectors 913 (i.e., K=N). Component intensities 950, component values 951, and component weights 952 are described in further detail in reference to FIG. 11.

Components 927 are sent to subset selector 928 which identifies a subset 929 of components 927. In some instances, subset 929 is identified based on an analysis of component intensities 950 such that each component of components 927 having a component intensity 950 below an upper intensity threshold and above a lower intensity threshold are included in subset 929. In some instances, only one of an upper intensity threshold and a lower intensity threshold is employed. In some instances, an inquiry is made into both component intensity 950 and client weights 952. For example, in some embodiments, subset 929 is identified such that each component of components 927 having a component intensity 950 below an upper intensity threshold and above a lower intensity threshold, and having a certain proportion of clients (e.g., 20%, 30%) with a client weight 952 below an upper client weight threshold and above a lower client weight threshold are included in subset 929.

In some embodiments, an inquiry is only made into client weights 952. For example, subset 929 may be identified such that each component of components 927 having a certain proportion of clients with a client weight 952 above a lower client weight threshold are included in subset 929. The certain proportion of clients may be a range (e.g., 10%-30%) based on data about the prevalence of certain sparse indicators. For example, a particular sparse indicator corresponding to a duplication may have an expected prevalence of 20%, and therefore components having a proportion of clients with a client weight above the lower client weight threshold between 15% and 25% may be included in subset 929. As another example, a particular sparse indicator corresponding to a deletion may have an expected prevalence of 5%, and therefore components having a proportion of clients with a client weight above the lower client weight threshold between 3% and 7% may be included in subset 929. Upper and lower intensity thresholds and upper and lower client weight thresholds may also be based on data about the prevalence of certain sparse indicators.

The one or more components of components 927 that are not identified in subset 929 may have terminating signal paths within subset selector 928. Optionally, components of components 927 not identified in subset 929 may be erased or deleted. Subset selector 928 is described in greater detail in reference to FIG. 10.

Assessment system 900 may include various processing systems for analyzing subset 929, including sparse indicator detector 914. Sparse indicator detector 914 may be similar or identical to system 800. In some instances, sparse indicator detector 914 sends one or more results to a sparse indicator data store 918. The results may include any of the following: a list of detected sparse indicators (e.g., duplication or deletion), a number of sparse indicators assigned to different buckets, an indication of whether a number of sparse indicators assigned to particular data buckets exceed a predetermined threshold or by how much the predetermined threshold is exceeded, and the like.

Sparse indicator detector 914 may determine that each component of subset 929 corresponds to a sparse indicator. Sparse indicator detector 914 may also determine, for each component of subset 929, which of the M clients are associated with a particular sparse indicator by analyzing client weights 952. Sparse indicator detector 914 may further determine the type of sparse indicator by analyzing normalized depth vectors 915 for the clients that are associated with the particular sparse indicator. For example, for a particular client that is associated with the particular sparse indicator (based on, for example, the client weight), a normalized depth vector having a corresponding value much less than 1 may indicate a deletion, and a normalized depth vector having a corresponding value much greater than 1 may indicate a duplication. In some instances, sparse indicator detector 914 may determine positional data for the sparse indicator based on component values 951 within the component. For example, the number of component values 951 in each of components 927 may be equal to N and may correspond to the number of elements in each of normalized depth vectors 915, depth vectors 913, and any generated client data sets. The component values can be analyzed (e.g., identifying maximum values) to determine which identifiers or subset of identifiers of a client data set corresponds to the sparse indicator.

Figure 10:
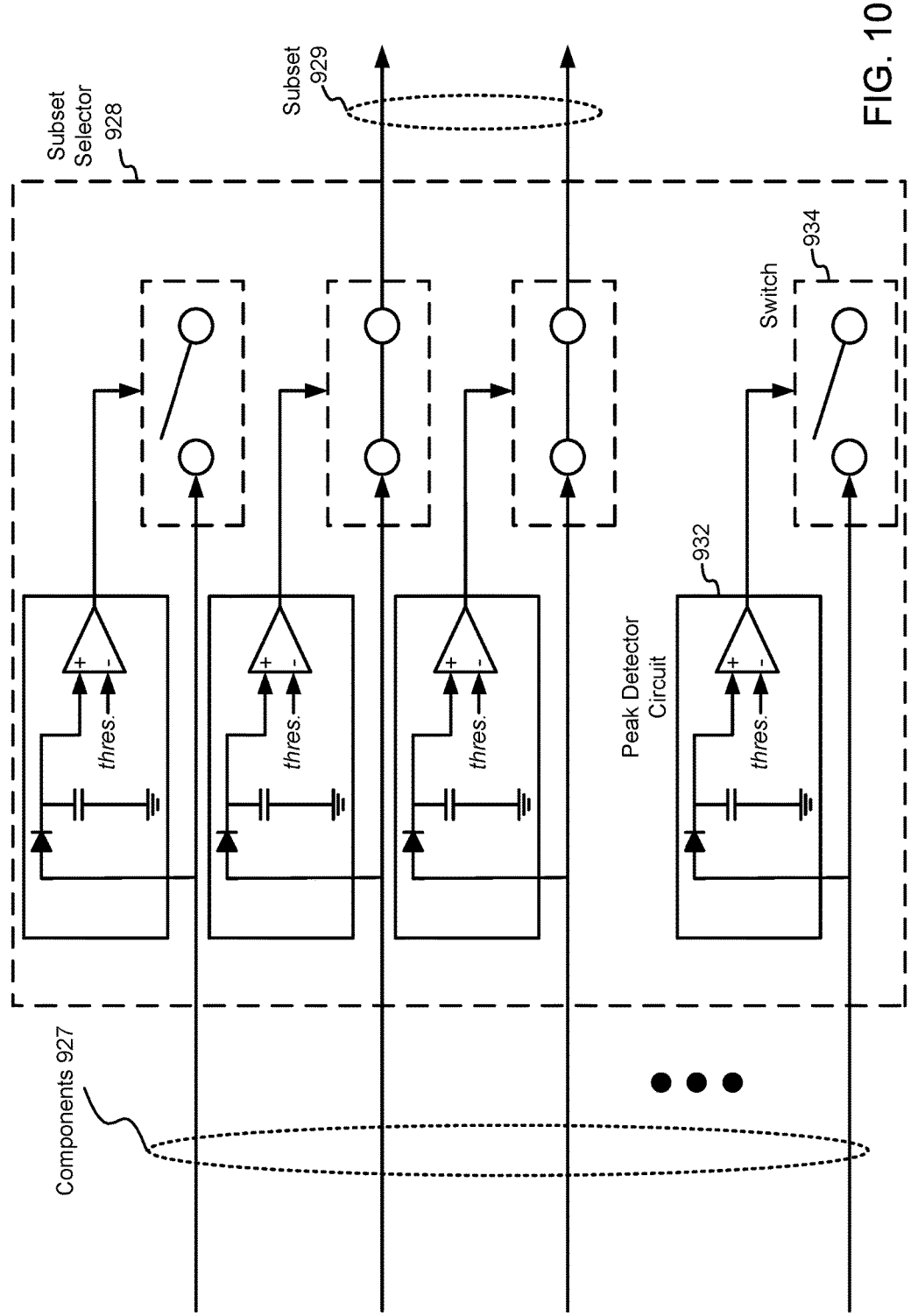
FIG. 10 shows a representation of a subset selector, in accordance with some embodiments.

Referring next to FIG. 10, a representation of subset selector 928 is shown. Subset selector 928 may include K peak detector circuits 932 for determining component intensities 950 and component values 951. Peak detector circuits 932 may include one or more diodes, capacitors, resistors (not shown), and comparators for comparing component intensities 950 and component values 951 to one or more thresholds such as upper and lower intensity thresholds and upper and lower client weight thresholds. Based on the comparisons, peak detector circuits 932 may cause switches 934 to be set to an open or closed position (an open position corresponding to a termination of a particular component and a closed position corresponding to a particular component of components 927 being included in subset 929).

Figure 11:
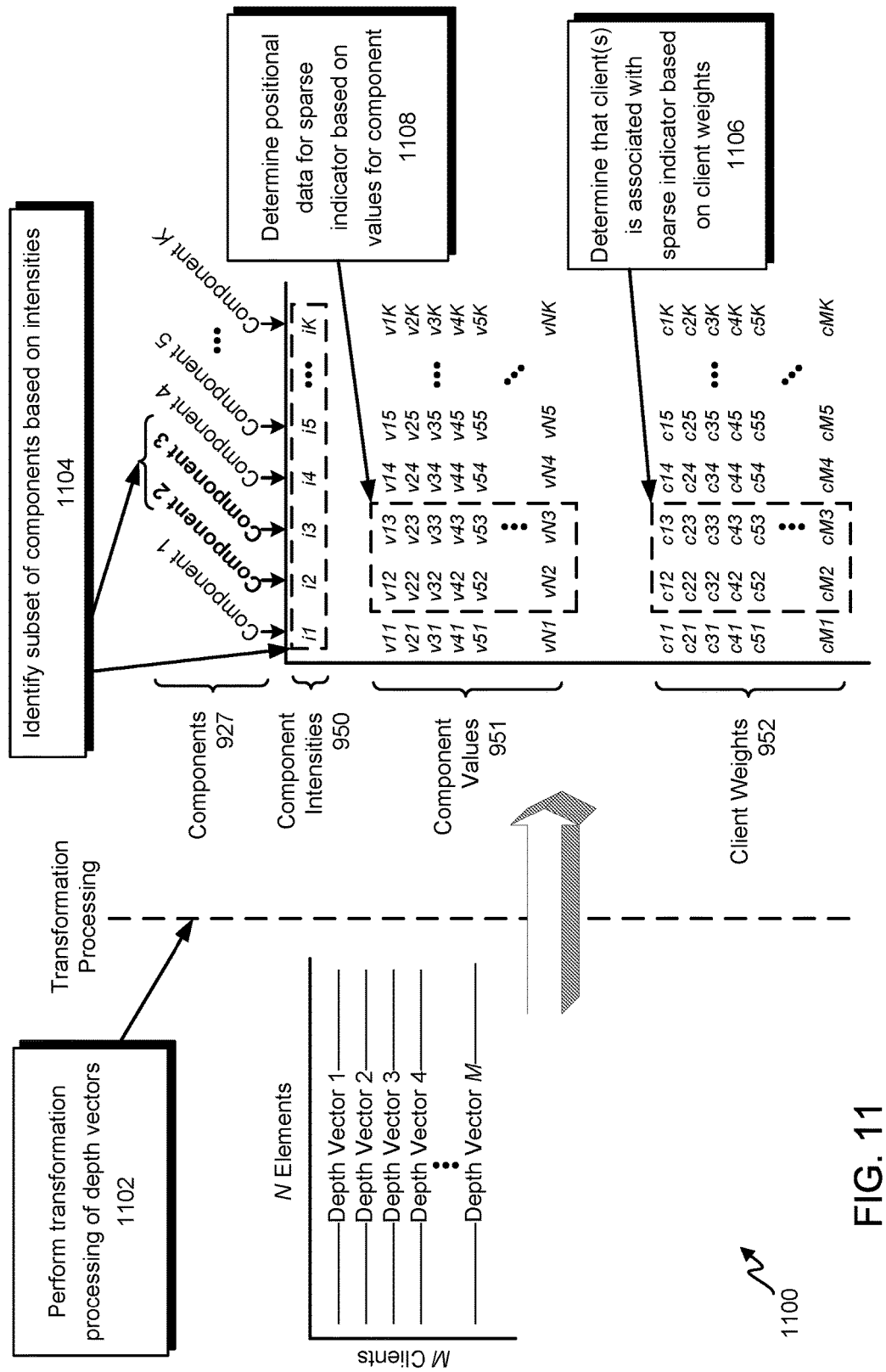
FIG. 11 shows a representation of a process for generating and transforming depth vectors for sparse-indicator detection, in accordance with some embodiments.

Referring next to FIG. 11, a representation of a process 1100 for generating and transforming depth vectors for sparse-indicator detection is shown. At block 1102, a transformation processing of normalized depth vectors 915 (or depth vectors 913) is performed to produce K components 927. During or subsequent to performance of the transformation processing, component intensities 950, component values 951, and client weights 952 are generated and/or identified as being included in, corresponding to, or associated with components 927. As shown in FIG. 11, the total number of component intensities 950 may be equal to K (1 for each component), the total number of component values 951 may be equal to N×K (N for each component), and the total number of client weights 952 may be equal to M×K (M for each component). Component intensities 950 are a measure of the extent to which each component accounts for cross-client differences in normalized depth vectors 915. Component values 951 are the values of components 927 themselves, which may be vectors of length N. Client weights 952 are a measure of how much each of the M clients contributes to each of the K components 927.

In some instances, normalized depth vectors 915 can be recreated by weighting and summing each of components 927 using client weights 952. For example, the $M^{th}$ depth vector corresponding to the $M^{th}$ client can be recreated as follows:

Depth Vector $M=(cM1\times \text{Component 1})+(cM2\times \text{Component 2})+(cM3\times \text{Component 3})+ \ldots +(cMK\times \text{Component } K)=cM1\times[v11,v21,v31,\ldots vN1]+cM2\times[v12,v22,v32,\ldots vN2]+cM3\times[v13,v23,v33,\ldots vN3]+\ldots +cMK\times[v1K,v2K,v3K,\ldots vNK]$.

At block 1104, subset 929 of components 927 is identified based on component intensities 950. In some instances, subset 929 is identified such that each component of components 927 having a component intensity 950 below an upper intensity threshold and above a lower intensity threshold are included in subset 929. In the embodiment shown in FIG. 11, components 2 and 3 are selected to be in subset 929 due to i2 and i3 being both below the upper intensity threshold and above the lower intensity threshold.

At block 1106, it is determined which clients are associated with components 2 and 3 based on client weights 952 (or are associated with the sparse indicators associated with components 2 and 3). A client may be determined to be associated with a component (and a sparse indicator associated with the component) if the client weight exceeds a threshold or if the client weight is one of the maximum client weights corresponding to the component. For example, it may be determined that clients 3, 8, and 9 are associated with component 2 (and the sparse indicator associated with component 2) due to c32, c82, and c92 being above threshold values or maximum values (compared to other client weights 952 corresponding to component 2). Similarly, it may be determined that clients 1, 8, and M are associated with component 3 (and the sparse indicator associated with component 3) due to c13, c83, and cM3 being above threshold values or maximum values (compared to other client weights 952 corresponding to component 3).

At block 1108, positional data for components 2 and 3 (and sparse indicators 2 and 3) are determined based on component values 951. For example, one or more maximum values of component values 951 for components 2 and 3 may identify which identifiers of the client data set correspond to the sparse indicator. For example, it may be determined that the sparse indicator associated with component 2 is positioned at elements 2 through 5 due to v22, v32, v42, and v52 being above threshold values or maximum values (compared to other component values 951 corresponding to component 2). Similarly, it may be determined that the sparse indicator associated with component 3 is positioned at elements 40 through 50 due to v403, v413, v423, v433, v443, v453, v463, v473, v483, v493, and v503 being above threshold values or maximum values (compared to other component values 951 corresponding to component 3).

Optionally, process 1100 may include a step for determining a type of sparse indicator for each component of subset 929 based on one or both of normalized depth vectors 915 or client weights 952. In some instances, a normalized depth vector value less than 1 may correspond to a deletion and a normalized depth vector value greater than 1 may correspond to a duplication. In some instances, a low or less than threshold value of client weight 952 may correspond to a deletion and a high or greater than threshold value of client weight 952 may correspond to a duplication.

Figure 12:
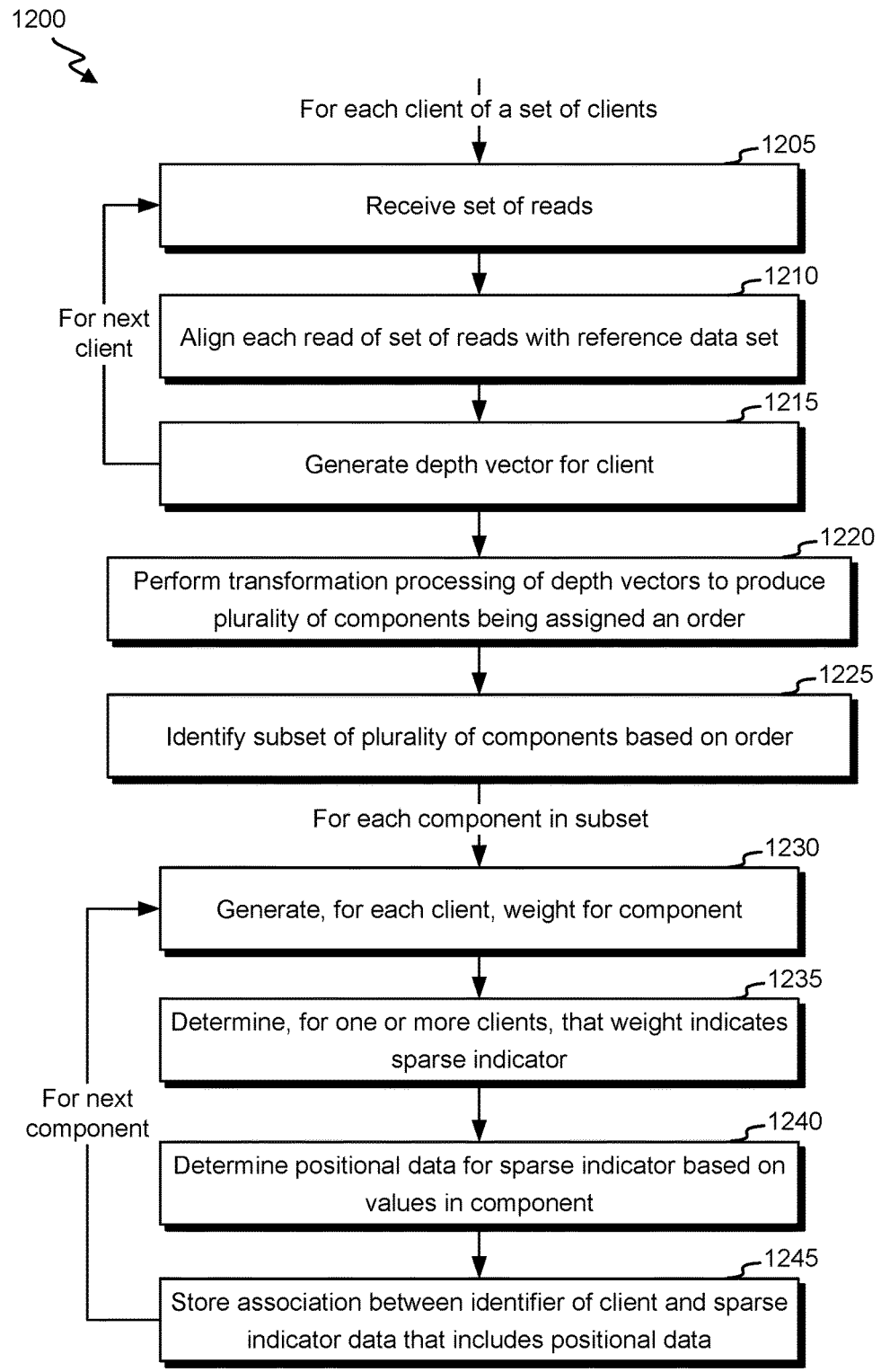
FIG. 12 shows a representation of a process for generating and transforming depth vectors for sparse-indicator detection, in accordance with some embodiments.

Referring next to FIG. 12, a representation of a process 1200 for generating and transforming depth vectors for sparse-indicator detection is shown. Process 1200 may be performed, for example, in part or in its entirety by an assessment system, such as assessment system 105, 305, or 900, or by multiple systems. Process 1200 begins by performing blocks 1205, 1210, and 1215 for each of a set of M clients. Blocks 1205, 1210, and 1215 may be performed iteratively for each of the M clients or may be performed for multiple clients during a single iteration. At block 1205, a set of reads corresponding to a single client are received. The set of reads may correspond to a set of reads 901. Each of the set of reads includes a set of identifiers which are arranged in a particular order in the read. The set of reads may be received all at once or over time a period of time.

At block 1210, each read of the set of reads is aligned with a portion of reference data set 910. Reference data set 910 includes a vector of identifiers. The portion can correspond to a subset of consecutive positions of reference data set 910 that is defined by a start position and an end position. Reads may be aligned based on a similarity determination between a particular read and various possible alignment positions along reference data set 910.

At block 1215, a depth vector (e.g., depth vector 913) corresponding to a single client is generated. Each depth vector includes a plurality of elements, each of which is generated based on a quantity of reads that include an identifier aligned to a portion of reference data set 910 that includes a particular position within reference data set 910. The particular position within reference data set 910 corresponds to particular element being generated. For example, a value for a first element of depth vector 913 may be 20 if there are 20 reads aligned to the first element. Similarly, a value for a second element of depth vector 913 may be 18 if there are 18 reads aligned to the second element. Depth vectors may be updated as new reads are received, or generation of depth vectors may be delayed until all reads have been received.

Optionally, depth vectors 913 may be converted into normalized depth vectors 915 by calculating a normalization factor 922 for each of the N elements of depth vectors 913 by averaging the values of the M depth vectors 913 at each position and taking the inverse of the average. Normalized depth vectors 915 are generated by multiplying depth vectors 913 by normalization factors 922. In some instances, a normalized depth vector is generated from a particular depth vector by, for each element of the particular depth vector, identifying one or more other depth vector values corresponding to other depth vectors and generating the normalization factor based on the identified other depth vector values. For example, the normalization factors may be generated by identifying depth vector values corresponding to some portion (e.g., 10%) of all depth vectors. Using normalized depth vectors 915 in place of depth vectors 913 may improve the accuracy of the sparse indicator detection.

At block 1220, a transformation processing of depth vectors 913 (or normalized depth vectors 915) is performed to produce K components 927. Each of components 927 includes component values 951 that comprise the component and a component intensity 950 that is a measure of the extent to which each component accounts for cross-client differences in depth vectors 913 (or normalized depth vectors 915). Each of components 927 and their corresponding component values 951 are orthogonal to each other and form an orthogonal basis set, and allow depth vectors 913 (or normalized depth vectors 915) to be recreated using client weights 952. Each of components 927 are assigned an order based on component intensities 927. For example, the order may inherently assigned by receiving, producing, or generating component intensities 927. The order may be a descending order such that the component having the largest component intensity 927 is first and the component having the smallest component intensity 927 is last. The order may be a descending order or an ascending order.

At block 1225, subset 929 of components 927 is identified based on the order. In some instances, the component with the highest component intensity 950 is determined to be associated with noise, and is not determined to be associated with a sparse indicator. In some instances, the one or more components with the lowest component intensities 950 are also not determined to be associated with a sparse indicator. In some embodiments, it is determined for each of the remaining components (after eliminating the component with the highest and lowest component intensities), the proportion of clients that contribute significantly to the component, which may be the proportion of clients with a client weight 952 above a lower client weight threshold.

After the proportion of contributing clients is determined for each of the remaining components, components having a proportion within an acceptable range are included in subset 929. For example, certain sparse indicators may have different acceptable ranges, e.g., an acceptable range of a proportion of contributing clients for sparse indicator A may be 5%-7%, an acceptable range of a proportion of contributing clients for sparse indicator B may be 0.1%-0.3%, and an acceptable range of a proportion of contributing clients for sparse indicator C may be 25%-30%. Subset 929 may be identified for a single sparse indicator or for multiple sparse indicators. Optionally, process 1200 may be performed a single time for multiple sparse indicators or multiple times for a single sparse indicator.

Process 1200 proceeds by performing blocks 1230, 1235, 1240, and 1245 for each component of subset 929. Blocks 1230, 1235, 1240, and 1245 may be performed iteratively for each of the components of subset 929 or may be performed for multiple components during a single iteration.

At block 1230, a client weight 952 for each of the M clients is generated for the component. Client weights 952 are a measure of how much each of the M clients contributes to each of the K components. A low client weight may indicate little contribution to cross-client differences of a particular depth vector and a high client weight may indicate significant contribution to cross-client differences of the particular depth vector. Each of components 927 may associated with M client weights 952.

At block 1235, it is determined, for one or more clients of the M clients, that the client weights for the one or more clients indicate that the one or more clients are associated with a sparse indicator. A client may be determined to be associated with a component and a sparse indicator when the client weight 952 associated with both the client and the component is above a lower client weight threshold or is a maximum client weight. For example, a client may be determined to be associated with a sparse indicator when the corresponding client weight 952 exceeds 0.1, 0.5, 1, 5, 10, and the like.

At block 1240, positional data for the sparse indicator is determined based on component values 951. Positional data may include a range of identifiers or elements at which a sparse indicator is determined to be positioned. The range of identifiers or elements may correspond to a set of positions within depth vectors 913, normalized depth vectors 915, reference data set 910, or a client data set. Positional data for the sparse indicator may be determined by identifying one or more above threshold values or maximum values of the component values 951 corresponding to the component. Groups of adjacent above threshold values or maximum values may be more important for positional data than outlier or single above threshold or maximum values as sparse indicators corresponding to duplications and deletions are likely to involve more than a few identifiers.

At block 1245, an association between an identifier of the client and sparse-indicator data is stored for one or more clients of the M clients. The identifier of the client may be a client number, a client name, a client account, or any other means for identifying a particular client of the M clients. The sparse-indicator data may include positional data, a type of sparse-indicator (duplication or deletion), a number of sparse-indicators, a likelihood of a sparse-indicator, and the like. Storing the association between the identifier of the client and the sparse-indicator data may include storing the identifier and the sparse-indicator data at a local or remote server, a local or remote data store, or at any storage location, sending the identifier and the sparse-indicator data to any location (e.g., sending to the client), retrieving the identifier and the sparse-indicator data from a storage location, accessing and modifying a previously stored version of the identifier and the sparse-indicator data, and the like.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for generating and transforming depth vectors for sparse-indicator detection, the method comprising:
for each client of a set of clients:
receiving a set of reads, each read of the set of reads being associated with the client, each read of the set of reads including a set of identifiers, the set of identifiers being arranged in a particular order in the read;
aligning each read of the set of reads with a portion of a reference data set; and
generating a depth vector for the client that includes a plurality of elements, each element of the plurality of elements being generated based on a quantity of reads that include an identifier aligned to a portion that includes a particular position within the reference data set; and
performing a transformation processing of the depth vectors to produce a plurality of components, each of the plurality of components being assigned an order based on an extent to which the component accounts for cross-client differences;
identifying a subset of the plurality of components based on the order; and
for each component in the subset:
generating, for each client in the set of clients, a weight for the component;
determining, for each client of one or more of the set of clients, that the weight for the component indicates that the client is to be associated with a sparse indicator;
determining positional data for the sparse indicator based on values in the component; and
storing, for each of the one or more of the set of clients, an association between an identifier of the client and sparse-indicator data that includes the positional data.

2. The method of claim 1, further comprising:
for each client of a set of clients:
generating a normalized depth vector for the client based on the depth vector for the client and a plurality of other depth vectors, each of the plurality of other depth vectors being associated with a corresponding other client different than the client;
wherein generating the normalized depth vector includes, for each element of the plurality of elements:
identifying, from each depth vector of at least one of the plurality of other depth vectors, an other depth value from the depth vector, the other depth value being associated with the element;
generating a normalization factor for the element based at least in part on each identified other depth value; and
defining a value for the element in the normalized depth vector based on a value for the element in the depth vector and the normalization factor.

3. The method of claim 1, wherein assigning the order to each of the plurality of components includes:
assigning an intensity to each of the plurality of components based on the extent to which the component accounts for cross-client differences; and
assigning the order to each of the plurality of components by sorting the plurality of components by intensity in descending order.

4. The method of claim 3, further comprising:
identifying one or more first components of the plurality of components; and
identifying one or more second components of the plurality of components;
wherein the intensity assigned to each of the one or more first components is greater than the intensity assigned to each of the one or more second components;
wherein the subset of the plurality of components includes the one or more first components but not the one or more second components.

5. The method of claim 4, wherein determining, for each client of one or more of the set of clients, that the weight for the component indicates that the client is to be associated with the sparse indicator includes:
determining that the weight for the component is above a predetermined threshold.

6. The method of claim 4, wherein determining the positional data for the sparse indicator based on the values in the component includes:
identifying one or more values of the values in the component that are above a predetermined threshold.

7. The method of claim 1, wherein each of the plurality of components includes a vector comprising the values, and wherein:
a size of the values corresponds to a size of the depth vector; and
a size of the plurality of components corresponds to a size of the set of clients.

8. The method of claim 1, further comprising:
determining whether the sparse indicator corresponds to a duplication or a deletion.

9. A system, comprising:
one or more data processors; and
a non-transitory computer readable storage medium containing instructions which when executed on the one or more data processors, cause the one or more data processors to perform actions including:

for each client of a set of clients:
receiving a set of reads, each read of the set of reads being associated with the client, each read of the set of reads including a set of identifiers, the set of identifiers being arranged in a particular order in the read;
aligning each read of the set of reads with a portion of a reference data set; and
generating a depth vector for the client that includes a plurality of elements, each element of the plurality of elements being generated based on a quantity of reads that include an identifier aligned to a portion that includes a particular position within the reference data set; and performing a transformation processing of the depth vectors to produce a plurality of components, each of the plurality of components being assigned an order based on an extent to which the component accounts for cross-client differences;

identifying a subset of the plurality of components based on the order; and for each component in the subset:
generating, for each client in the set of clients, a weight for the component;
determining, for each client of one or more of the set of clients, that the weight for the component indicates that the client is to be associated with a sparse indicator;
determining positional data for the sparse indicator based on values in the component; and
storing, for each of the one or more of the set of clients, an association between an identifier of the client and sparse-indicator data that includes the positional data.

10. The system of claim 9, wherein the actions further include:

for each client of a set of clients:
generating a normalized depth vector for the client based on the depth vector for the client and a plurality of other depth vectors, each of the plurality of other depth vectors being associated with a corresponding other client different than the client;
wherein generating the normalized depth vector includes, for each element of the plurality of elements:
identifying, from each depth vector of at least one of the plurality of other depth vectors, an other depth value from the depth vector, the other depth value being associated with the element;
generating a normalization factor for the element based at least in part on each identified other depth value; and
defining a value for the element in the normalized depth vector based on a value for the element in the depth vector and the normalization factor.

11. The system of claim 9, wherein assigning the order to each of the plurality of components includes:

assigning an intensity to each of the plurality of components based on the extent to which the component accounts for cross-client differences; and
assigning the order to each of the plurality of components by sorting the plurality of components by intensity in descending order.

12. The system of claim 11, wherein the actions further include:

identifying one or more first components of the plurality of components; and
identifying one or more second components of the plurality of components;
wherein the intensity assigned to each of the one or more first components is greater than the intensity assigned to each of the one or more second components;
wherein the subset of the plurality of components includes the one or more first components but not the one or more second components.

13. The system of claim 12, wherein determining, for each client of one or more of the set of clients, that the weight for the component indicates that the client is to be associated with the sparse indicator includes:

determining that the weight for the component is above a predetermined threshold.

14. The system of claim 12, wherein determining the positional data for the sparse indicator based on the values in the component includes:

identifying one or more values of the values in the component that are above a predetermined threshold.

15. The system of claim 9, wherein each of the plurality of components includes a vector comprising the values, and wherein:

a size of the values corresponds to a size of the depth vector; and
a size of the plurality of components corresponds to a size of the set of clients.

16. The system of claim 9, further comprising:

determining whether the sparse indicator corresponds to a duplication or a deletion.

17. A computer-program product tangibly embodied in a non-transitory machine-readable storage medium, including instructions configured to cause one or more data processors to perform actions including:

for each client of a set of clients:
receiving a set of reads, each read of the set of reads being associated with the client, each read of the set of reads including a set of identifiers, the set of identifiers being arranged in a particular order in the read;
aligning each read of the set of reads with a portion of a reference data set; and
generating a depth vector for the client that includes a plurality of elements, each element of the plurality of elements being generated based on a quantity of reads that include an identifier aligned to a portion that includes a particular position within the reference data set; and performing a transformation processing of the depth vectors to produce a plurality of components, each of the plurality of components being assigned an order based on an extent to which the component accounts for cross-client differences;

identifying a subset of the plurality of components based on the order; and for each component in the subset:
generating, for each client in the set of clients, a weight for the component;
determining, for each client of one or more of the set of clients, that the weight for the component indicates that the client is to be associated with a sparse indicator;
determining positional data for the sparse indicator based on values in the component; and storing, for each of the one or more of the set of clients, an association between an identifier of the client and sparse-indicator data that includes the positional data.

18. The computer-program product of claim 17, wherein the actions further include:
for each client of a set of clients:
generating a normalized depth vector for the client based on the depth vector for the client and a plurality of other depth vectors, each of the plurality of other depth vectors being associated with a corresponding other client different than the client;
wherein generating the normalized depth vector includes, for each element of the plurality of elements:
identifying, from each depth vector of at least one of the plurality of other depth vectors, an other depth value from the depth vector, the other depth value being associated with the element;
generating a normalization factor for the element based at least in part on each identified other depth value; and
defining a value for the element in the normalized depth vector based on a value for the element in the depth vector and the normalization factor.

19. The computer-program product of claim 17, wherein assigning the order to each of the plurality of components includes:
assigning an intensity to each of the plurality of components based on the extent to which the component accounts for cross-client differences; and
assigning the order to each of the plurality of components by sorting the plurality of components by intensity in descending order.

20. The computer-program product of claim 19, wherein the actions further include:
identifying one or more first components of the plurality of components; and
identifying one or more second components of the plurality of components;
wherein the intensity assigned to each of the one or more first components is greater than the intensity assigned to each of the one or more second components;
wherein the subset of the plurality of components includes the one or more first components but not the one or more second components.

* * * * *